US008009908B2

(12) United States Patent
Yago

(10) Patent No.: US 8,009,908 B2
(45) Date of Patent: Aug. 30, 2011

(54) AREA TESTING METHOD FOR IMAGE PROCESSING

(75) Inventor: Kazuya Yago, Amagasaki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 976 days.

(21) Appl. No.: 11/925,222

(22) Filed: Oct. 26, 2007

(65) Prior Publication Data

US 2008/0101698 A1    May 1, 2008

(30) Foreign Application Priority Data

Oct. 27, 2006    (JP) ................................. 2006-293200

(51) Int. Cl.
*G06K 9/00*    (2006.01)
*G06K 9/62*    (2006.01)
(52) U.S. Cl. ....................... 382/170; 382/224
(58) Field of Classification Search .................. 382/171, 382/174, 224–228, 170; 358/453, 462, 464
See application file for complete search history.

(56) References Cited

U.S. PATENT DOCUMENTS

| | | | | |
|---|---|---|---|---|
| 5,774,584 | A * | 6/1998 | Matsumoto et al. | 382/194 |
| 5,862,270 | A * | 1/1999 | Lopresti et al. | 382/306 |
| 5,889,884 | A * | 3/1999 | Hashimoto et al. | 382/168 |
| 6,104,832 | A | 8/2000 | Saito et al. | |
| 6,371,373 | B1 * | 4/2002 | Ma et al. | 235/462.1 |
| 6,385,338 | B1 * | 5/2002 | Saito et al. | 382/173 |
| 7,474,337 | B1 * | 1/2009 | Cooper | 348/222.1 |
| 7,583,816 | B2 * | 9/2009 | Kakinami et al. | 382/104 |
| 2001/0021279 | A1 | 9/2001 | Nakajima et al. | |

FOREIGN PATENT DOCUMENTS

| | | |
|---|---|---|
| JP | 06-208625 | 7/1994 |
| JP | 07-334616 | 12/1995 |
| JP | 08-044822 | 2/1996 |
| JP | 08-249419 | 9/1996 |
| JP | 2001-203876 | 7/2001 |
| JP | 2006-128987 | 5/2006 |

OTHER PUBLICATIONS

Park et al. ("An edge-based block segmentation and classification for document analysis with automatic character string extraction", IEEE International Conf. on Systems, Man and Cybernetics, vol. 1, 1996, pp. 707-712).*
Kim et al. ("Text region extraction and text segmentation on camera-captured document style images", IEEE International Conf. on Document Analysis and Recognition, 2005).*
Japanese Office Action mailed on Sep. 2, 2008 directed towards foreign application No. 2006-293200; 4 pages.

* cited by examiner

*Primary Examiner* — Yubin Hung
(74) *Attorney, Agent, or Firm* — Morrison & Foerster LLP

(57) ABSTRACT

A method for deciding correctly a type of a specific area of an image having inclination includes the steps of generating an edge image based on a target image to be a target of image processing, generating a first histogram indicating the number of edge pixels existing in the lateral direction at each position in the longitudinal direction within a predetermined area and a second histogram indicating the number of the edge pixels existing in the longitudinal direction at each position in the lateral direction with respect to the edge pixels that indicate an edge in the predetermined area of the edge image, determining a variance value of a width of a mountain having an extreme value that exceeds a predetermined threshold value in the histograms, and deciding whether or not the predetermined area is one of a table area and a graph area based on the variance value.

10 Claims, 24 Drawing Sheets

AREA TESTING METHOD FOR IMAGE PROCESSING

This application is based on Japanese patent application No. 2006-293200 filed on Oct. 27, 2006, the contents of which are hereby incorporated by reference.

BACKGROUND OF THE INVENTION

1. Field of the Invention

The present invention relates to a method or a device for testing (deciding) a type of a specific area included in an image.

2. Description of the Prior Art

Conventionally, specific areas are extracted from an image data (an image) of an original that is read by a scanner or the like, and each of the extracted areas is processed with image processing in accordance with the area.

In such image processing, a process for deciding a type (an attribution) of the extracted area is performed in accordance with characteristics of images included in the area.

Conventionally, as an example of such a decision process, it is determined whether or not the area is a table area that includes an image about a "table."

It is common method for a decision process about a table area to count the number of ruled lines indicated in the image of the area and to perform the decision process in accordance with the number of ruled lines. Concerning this method, there are following methods proposed.

From the inputted image information, continuous black pixels are detected so that a rectangular area is recognized. A type of the recognized area such as "character", "graphic", "table" or the like is recognized temporarily by using a width, a height, a dimension and pixel density of the area. A histogram is generated with respect to the area that was recognized temporarily to be "table", and a location where a shape of the histogram is more than or equal to a predetermined threshold value is regarded as a ruled line. Then, if the number of ruled lines is more than a predetermined threshold value, the type of the area is determined to be "table."

In another method, a graphic area including a table area is extracted from a document image. Then, a part where a predetermined threshold value or more black pixels continue is extracted as a ruled line, and a ruled line image is generated. Table area likelihood is determined from the ruled line image, and it is decided whether or not the target image is a table area based on the table area likelihood.

Other than the above-mentioned method in which the number of ruled lines is counted, the following method is proposed.

A circumscribed rectangle of a black pixel area of the image data is determined, and it is decided whether or not a width and a height of the circumscribed rectangle are larger than predetermined values. If they are larger than predetermined values, it is decided whether or not there are two or more intersections within the circumscribed rectangle. If there are two or more intersections, the circumscribed rectangle is decided to be a table area.

However, the first method is not effective if the image is inclined. If the image is inclined, a ruled line included in the image extends over a plurality of lines (a line means continuous pixels extending in the vertical or horizontal direction). Thus, the number of the ruled lines cannot be determined correctly.

Even if correction of the inclination is performed, a small inclination (approximately 0.5 degrees) remains in many cases, which may cause a bad influence.

For example, it is supposed that the number of pixels aligned for constituting a ruled line having a width of one pixel is denoted by x. If the image is inclined by 1 degree, tan $1=1/x$. Therefore, $x=57.2$ pixels. This can be converted into a length of approximately 4.84 mm. Moreover, if the image is inclined by 0.5 degrees, tan $0.5=1/x$. Therefore, $x=114.5$ pixels, which can be converted into a length of approximately 9.68 mm (or approximately 10 mm). In other words, if the image of the area is inclined by 0.5 degrees, the decision to be a ruled line is not performed unless the threshold value for the decision is set to a value less than 10 mm.

Continuation of the black pixels for approximately 10 mm can happen in an area other than the table area. Therefore, if the threshold value is set to a small value as described above, an area other than a table area may be decided to be a table area easily and incorrectly, which may lower accuracy of decision. This may also happen in the second method.

Moreover, according to the third method, if there are two or more intersections within the circumscribed rectangle, the circumscribed rectangle is decided to be a table area. However, there is an image having many areas except a table area where there are two or more intersections. In this case, incorrect decision may occur in many.

SUMMARY OF THE INVENTION

An object of the present invention is to provide a method and a device that can decide a type of a specific area in an image more correctly than a conventional method and device.

An area testing method according to one aspect of the present invention is an area testing method for deciding a type of an area included in a target image to be a target of image processing. The method includes an edge image generation step of generating an edge image in accordance with the target image, a histogram generation step of generating a first histogram indicating the number of edge pixels that exist in the lateral direction at each position in the longitudinal direction within a predetermined area and a second histogram indicating the number of the edge pixels that exist in the longitudinal direction at each position in the lateral direction within the predetermined area, the edge pixels indicating an edge in the predetermined area of the generated edge image, a variance value calculation step of determining a variance value of a width of a mountain having an extreme value that exceeds a predetermined threshold value in the generated first histogram and second histogram, and a decision step of deciding whether or not the predetermined area is at least one of a table area and a graph area based on the determined variance value.

The area testing method described above can decide a type of a specific area of an image correctly even if the image is inclined.

Herein, the "area testing method" may be called an "area type deciding method".

BRIEF DESCRIPTION OF THE DRAWINGS

FIG. 5 is a diagram showing an example of an original image, a brightness original image and the like.

DESCRIPTION OF THE PREFERRED EMBODIMENTS

The preferred embodiments of the invention will now be described in detail with reference to the attached drawings.

In general, a function called a highly compressed PDF or compact PDF is used. In this function, a specific area is extracted from image data, and a process corresponding to the area is performed in each area, so that a portable document format file (a PDF file) having small data quantity is generated.

In this embodiment, an example of a case where the present invention is applied to a process in which an image forming apparatus 1 generates the highly compressed PDF file will be described.

[Structure of the Image Forming Apparatus]

Figure 1:
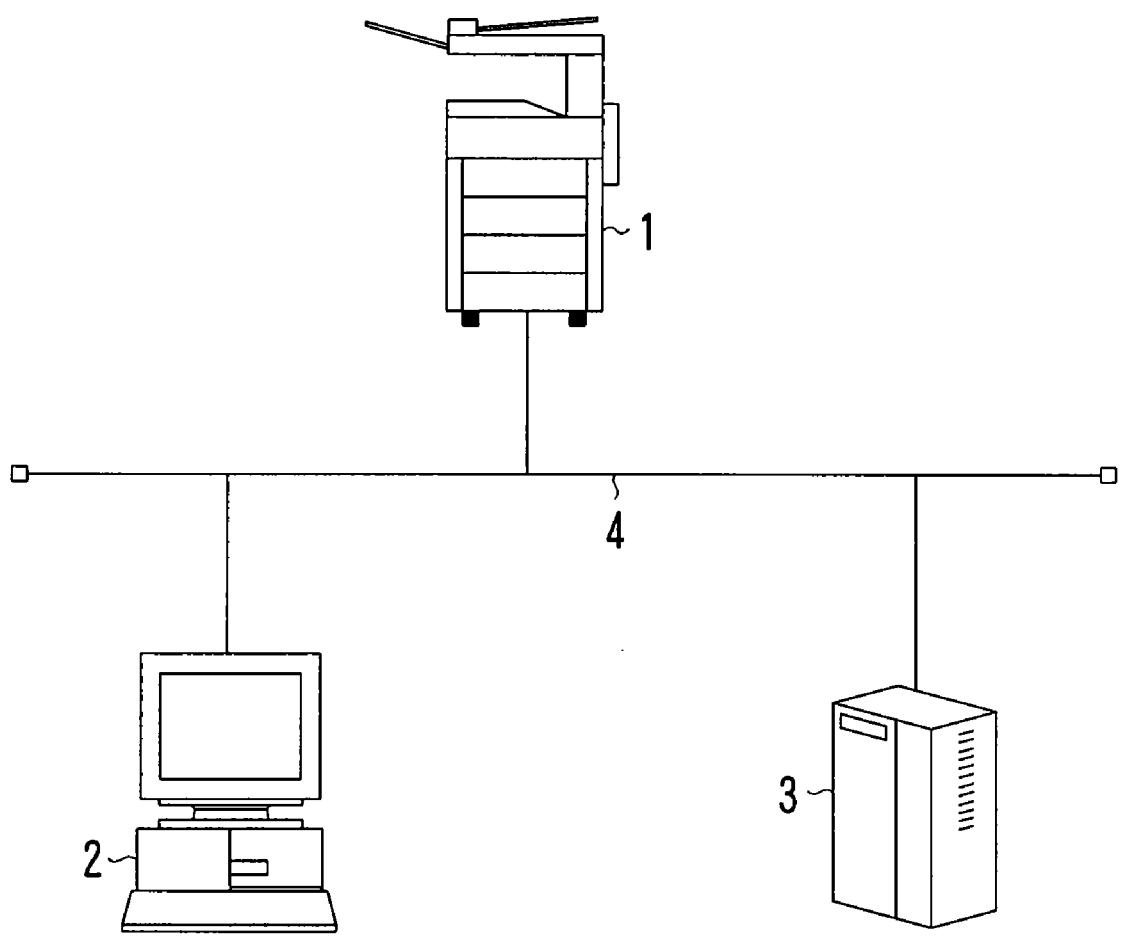
FIG. 1 is a diagram showing an example of a system structure including an image forming apparatus.

The image forming apparatus 1 shown in FIG. 1 is an image processing apparatus in which various functions are integrated including a copy, a scanner, a facsimile, a network printer, a document server and a file transmitter. It may be called an MFP (Multi Function Peripherals).

The image forming apparatus 1 is installed in a government office or a company office, a public facility such as a school or a library, a shop such as a convenience store, or other various places, so that it is used by a plurality of users. In addition, it can be connected to a terminal device 2 such as a personal computer or a workstation and to a server 3 via a communication circuit 4. The Internet, a LAN, a public circuit, a private line or the like is used as the communication circuit 4.

Figure 2:
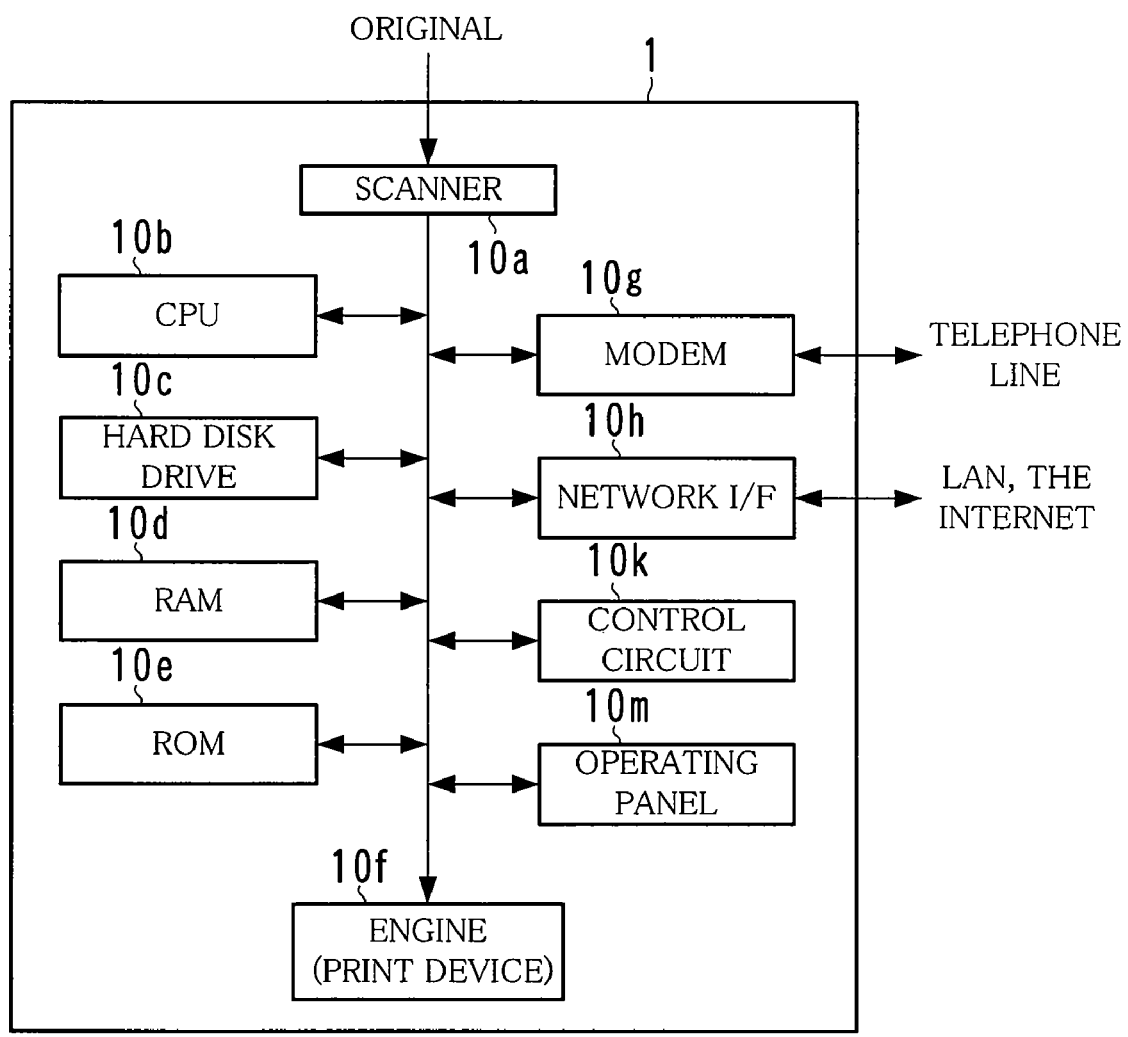
FIG. 2 is a diagram showing an example of a hardware structure of the image forming apparatus.

The image forming apparatus 1 is made up of a scanner 10a, a CPU 10b, a hard disk drive 10c, a RAM 10d, a ROM 10e, a print device 10f, a modem 10g, a network interface 10h, a control circuit 10k, an operating panel 10m and the like as shown in FIG. 2.

The scanner 10a is a device for reading optically images of photographs, characters, pictures, diagrams and the like drawn on an original paper sheet (hereinafter simply referred to as an "original") so that the read image is converted into electronic data. The image data of the read original is stored in the RAM 10d and various processes are performed on the data so that a file is generated. In this embodiment, a color scanner is used.

The print device 10f is a device for printing the image data (image) read by the scanner 10a or an image transmitted from the terminal device 2 or the like on a paper sheet with four colors of toner including yellow, magenta, cyan and black.

The operating panel 10m is made up of an operating portion and a display portion. A numeric keypad or the like is used as the operating portion, and a liquid crystal display or the like is used as the display portion. A user gives instructions of starting or stopping execution of a process or other instructions to the image forming apparatus 1 by operating the operating portion, so as to designate a process condition such as a destination of data, a scanning condition or an image file format and to designate other various items. The display portion displays a screen for giving a message or instructions to the user, a screen for the user to input a type of a desired process and a process condition of the same and a screen that shows a result of a process performed by the image forming apparatus 1. If a touch panel is used as the operating panel 10m, the touch panel works as both the operating portion and the display portion. In this way, the operating panel 10m plays a role of a user interface for a user who operates the image forming apparatus 1.

The CPU 10b performs a process for converting an image data of an original read by the scanner 10a into a file of a format such as TIFF, JPEG, bitmap, PDF or the like. It also performs an overall control of the image forming apparatus 1, which includes detection of inputs from a user, display control of the operating panel 10m, generation of electronic mail and the like.

The modem 10g includes an embedded NCU (Network Control Unit) for making connection to other facsimile terminals via an analogue public circuit and performing data control and modulation and demodulation of a facsimile data based on a facsimile protocol. The network interface 10h is an NIC (Network Interface Card), which makes connection to the terminal device 2 or the like via the LAN or the Internet so as to perform generation of a protocol or the like.

The control circuit 10k is a circuit for controlling a device such as the hard disk drive 10c, the operating panel 10m, the scanner 10a, the print device 10f, the modem 10g, the network interface 10h or the like.

The hard disk drive 10c stores programs, data and the like for realizing functions of each portion that will be described with reference to FIG. 3. These are read out to the RAM 10d as necessity and the programs are executed by the CPU 10b. A part or a whole of the programs or the data may be stored in the ROM 10e. In addition, a part or a whole of the functions shown in FIG. 3 may be realized by the control circuit 10k.

[Functional Structure of the Image Processing Apparatus]

Next, processes of each portion of the image forming apparatus 1 will be described with reference to FIG. 3 and other drawings.

Figure 3:
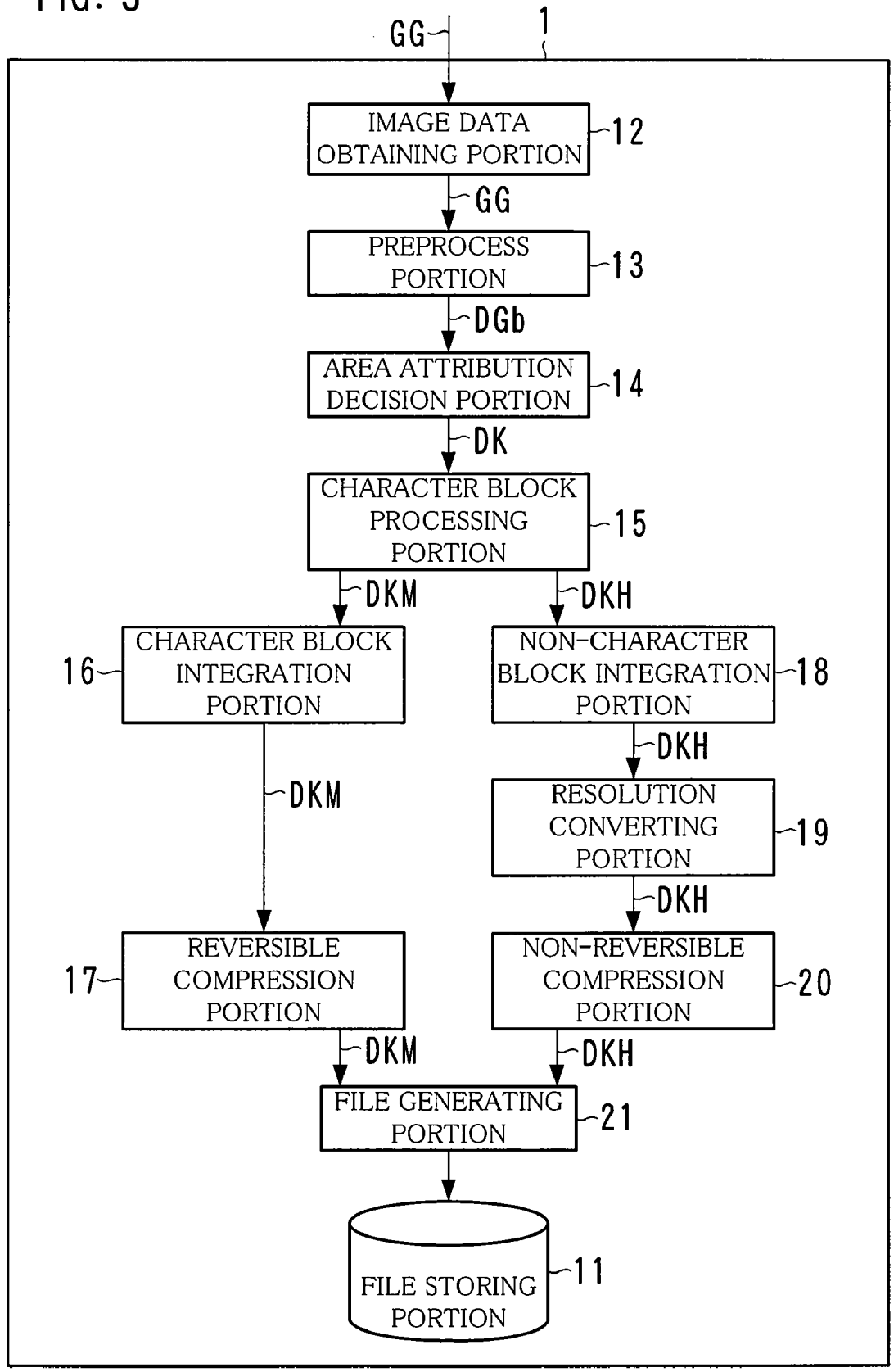
FIG. 3 is a diagram showing an example of a functional structure of the image forming apparatus.

As shown in FIG. 3, the image forming apparatus 1 is made up of a file storing portion 11, an image data obtaining portion 12, a preprocess portion 13, an area attribution decision portion 14, a character block processing portion 15, a character block integration portion 16, a lossless compression portion 17, a non-character block integration portion 18, a resolution converting portion 19, a lossy compression portion 20, a file generating portion 21 and the like.

The file storing portion 11 stores a PDF file generated by the file generating portion 19.

The image data obtaining portion 12 obtains an original image data GG that is an image data of an original read by the scanner 10a. The original image data GG is outputted from the scanner 10a as an image data of a format such as TIFF, JPEG, bitmap or the like. Note that "data" may be omitted in the "image data" and "original image data" so as to refer to them simply as "image" and "original image" in the following description as well as in the other image data that will be described later.

The preprocess portion 13 performs a preprocess for the area attribution decision portion 14. The preprocess portion 13 is made up of a ground removing portion 41, a brightness image generating portion 42, a smoothing portion 43 and the like as shown in FIG. 4.

Figure 4:
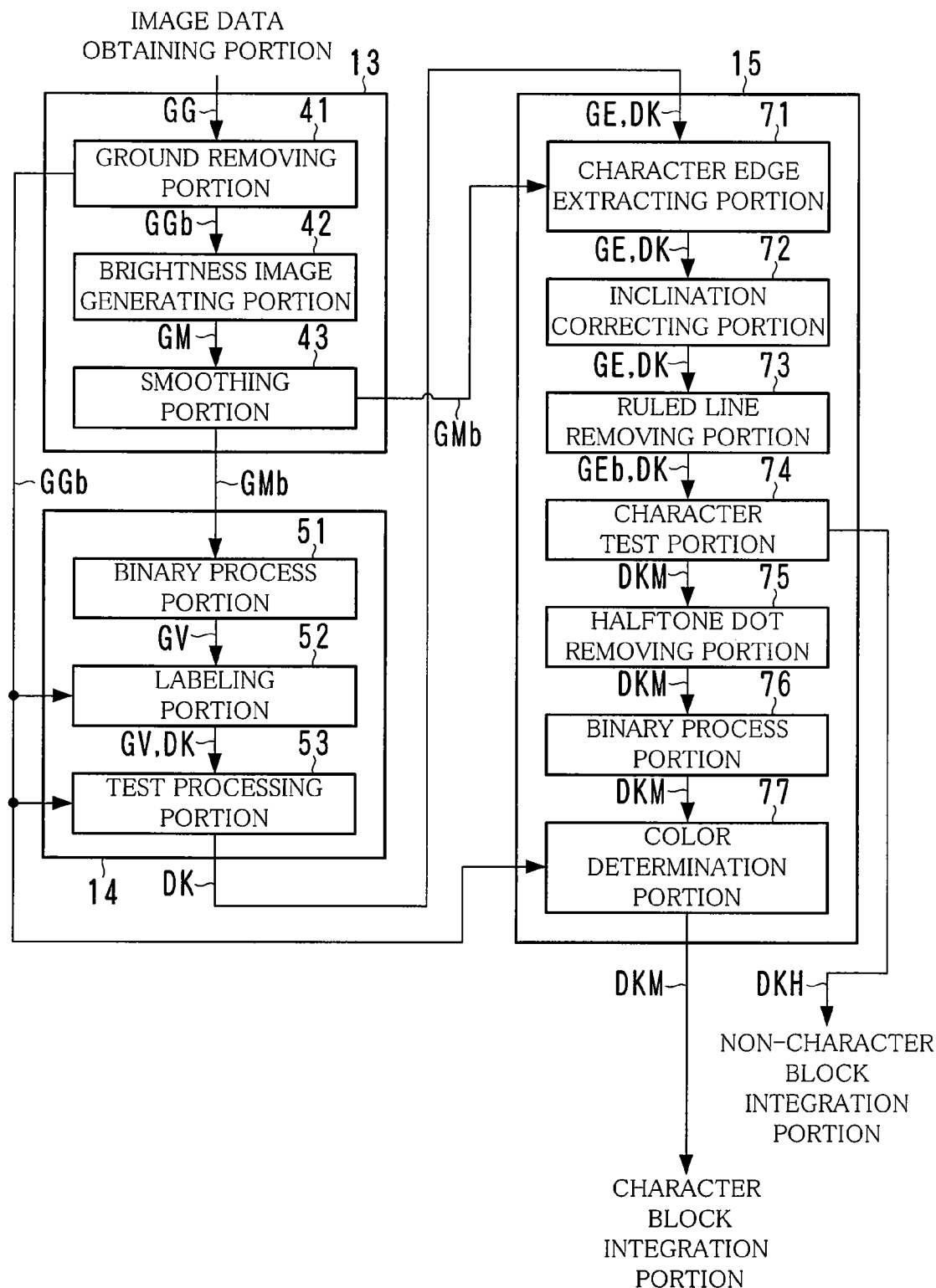
FIG. 4 is a diagram showing an example of a structure including a preprocess portion, an area attribution decision portion and a character block processing portion.

In FIG. 4, the ground removing portion 41 performs a contrast enhancement process on an original image GG and removes a ground portion that is shown with a light color. Thus, image tendency of the original image GG is organized.

The brightness image generating portion 42 calculates brightness in accordance with an original image GGb after the process of removing the ground and generates an image (a brightness image) that is shown by brightness. The brightness image is generated because the processes after this process are performed with respect to the brightness image as a target.

Figure 5:
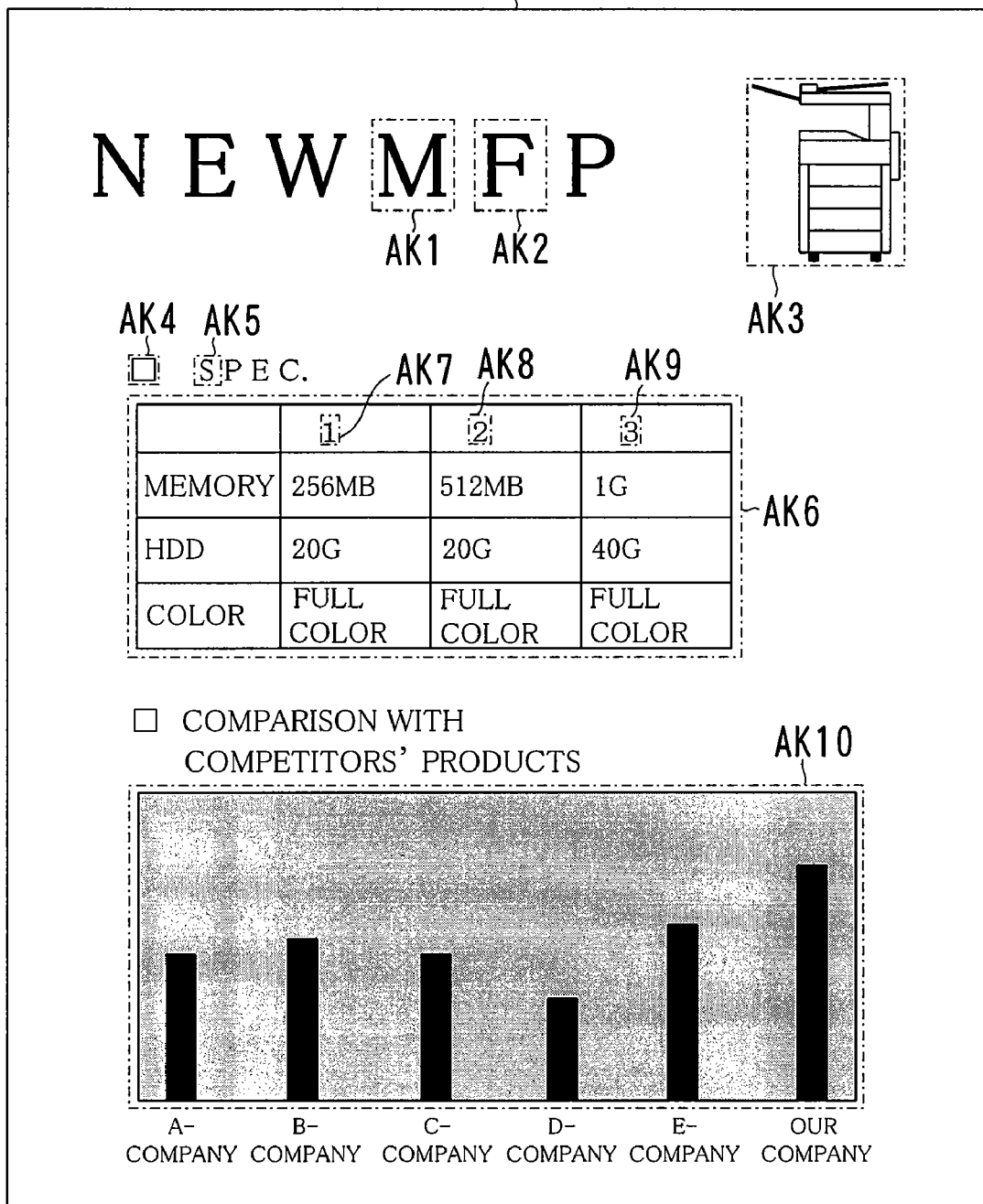

Thus, a brightness original image GM that is a brightness image corresponding to the first original image GG is generated. For example, in the case of the original image GG as shown in FIG. 5, a brightness original image GM that shows an image having the corresponding contents is generated as shown in FIG. 5. In other words, the "brightness image corresponding to the first original image GG" means a brightness image that shows contents corresponding to the original image GG in the area of range that is the same as or corresponding to the first original image GG like this example. This can be applied to other images in the same way.

Note that the brightness original image GM having 8-bit gradation property is generated from an original image GGb that is a full color image (a color image) having 24-bit gradation property of primary colors of R (red), G (green) and B (blue) (hereinafter referred to as "RGB") in the present embodiment.

The smoothing portion 43 performs a smoothing process on the brightness original image GM generated by the brightness image generating portion 42. Since noises are removed by the smoothing process, errors in detecting information in processes after the process can be reduced.

With reference to FIG. 3 again, the area attribution decision portion (a diagram photograph decision portion) 14 is made up of a binary process portion 51, a labeling portion 52, a test processing portion 53 and the like as shown in FIG. 4, and it performs a process for testing (discriminating) an attribution (a type) of a specific area included in the brightness original image GMb after the smoothing process. More specifically, a process for classifying (separating or dividing) areas having different attributions is performed.

In FIG. 4, the binary process portion 51 performs the binary process on the brightness original image GMb so as to generate a binary original image GV that is a binary image corresponding to the first original image GG.

The labeling portion 52 detects a group of connected black pixels made up of connected black pixels (dotted pixels) from the binary original image GV generated by the binary process portion 51, and it performs labeling on the group of connected black pixels. More specifically, the same identification number (a labeling number) is assigned to pixels that constitute one group of connected black pixels, and a rectangular area that includes (encloses) the group of connected black pixels is defined and determined so that a position thereof is detected. Alternatively, groups of connected black pixels located within a predetermined distance may be regarded as one group of connected black pixels, so that labeling is performed on the groups of connected black pixels that were regarded as one. In this way, one rectangular area is defined for characters or the like that are located in relatively close distance from each other. Note that this labeling is performed because the next process in the test processing portion 53 is performed on a rectangular area basis.

Hereinafter, each pixel after the labeling may be referred to as a "labeling pixel". In addition, the rectangular area including the group of connected black pixels may be referred to as a "block AK1", a "block AK2", and so on. In addition, they may be referred to as a "block AK" integrally by omitting the serial suffix numbers. Other reference symbols may also be used separately by adding serial suffix numbers or integrally by omitting the serial suffix numbers.

The original image GG includes parts (partial images) having various contents like the example shown in FIG. 5. For example, there are a partial image indicating a small character, a partial image indicating a small frame line, a partial image indicating a graphic such as a circle or a triangle, a partial image of a photograph, a partial image indicating a table, a partial image indicating a graph, a partial image indicating others such as a large character, and the like.

These partial images include a group of connected black pixels when the binary process is performed on them. Therefore, in the above-mentioned labeling, the block AK is determined from the binary original image GV on the partial image basis. When a relationship with the original image GG shown in FIG. 5 is considered, the blocks AK1, AK2, and so on as shown in FIG. 5 by the dot and dash line are determined. Although it is omitted in FIG. 5, the labeling number is assigned also to each of other characters that are not enclosed by the dot and dash line within the original image GG. The labeling number is also assigned to each of other characters in the block AK6 in the same way.

Note that the "partial image indicating a small character" is an image included in the block AK5 shown in FIG. 5, for example. The "partial image indicating a small frame line" is an image included in the block AK4. The "partial image of a photograph" is an image included in the block AK3. The "partial image indicating a table" is an image included in the block AK6. The "partial image indicating a graph" is an image included in the block AK10. The "partial image indicating others such as a large character" is an image included in the block AK1.

Furthermore, the labeling portion 52 obtains a color image of a part corresponding to the block AK in the original image GG or the original image GGb. Then, it generates the block data DK that indicates information about the block AK such as a position of the block AK (a block position), a size thereof (a block size), the obtained color image and the like. In the following description, an image such as the color image indicated by the block data DK or the like may be referred to as a "block image". When a process is performed on the block AK in processes after this process, information of the block AK to be a target of the process is obtained from the corresponding block data DK.

Note that the block position is indicated by coordinates of the upper left end pixel in the block AK in the original image GG where the origin is the upper left end of the original image GG in the present embodiment. The block size is indicated by the number of pixels in the longitudinal direction and the number of pixels in the lateral direction in the block AK.

The test processing portion 53 performs a process for deciding an attribution of the block AK in accordance with characteristics of an image in the block AK.

More specifically, the process for decision is performed as follows. An attribution of the block AK defined for a small partial image such as a character, a frame line or the like is decided to be a "small area." An attribution of the block AK defined for a partial image indicating a ground (a partial image for a ground) is defined to be a "ground area." An attribution of the block AK defined for a partial image of a photograph is defined to be a "photograph area." An attribution of the block AK defined for a partial image indicating a table is defined to be a "table area." An attribution of the block AK defined for a partial image indicating a graph is defined to be a "graph area." An attribution of the block AK defined for other partial image indicating a large character or the like is defined to be an "other area."

Note that the "partial image indicating a ground" is a partial image that is painted with one color.

In the present embodiment, an area of the partial image indicating a graphic such as a circle, a triangle or the like (a "graphic area") is regarded as the "photograph area".

Note that a procedure and the like of the process performed by the test processing portion 53 will be described in detail later in [Structure of the test processing portion].

With reference to FIG. 3 again, the character block processing portion (a character extracting portion) 15 is made up of a character edge extracting portion 71, an inclination correcting portion 72, a ruled line removing portion 73, a character test portion 74, a halftone dot removing portion 75, a binary process portion 76, a color determination portion 77 and the like as shown in FIG. 4. These portions perform predetermined processes on the block AK that includes a character.

In FIG. 4, the character edge extracting portion 71 extracts edge portions in the brightness original image GMb after the smoothing process and generates an edge image indicating the edge portions in the image. The edge image is an image as shown in FIGS. 6A and 6B, for example.

Figure 6A:
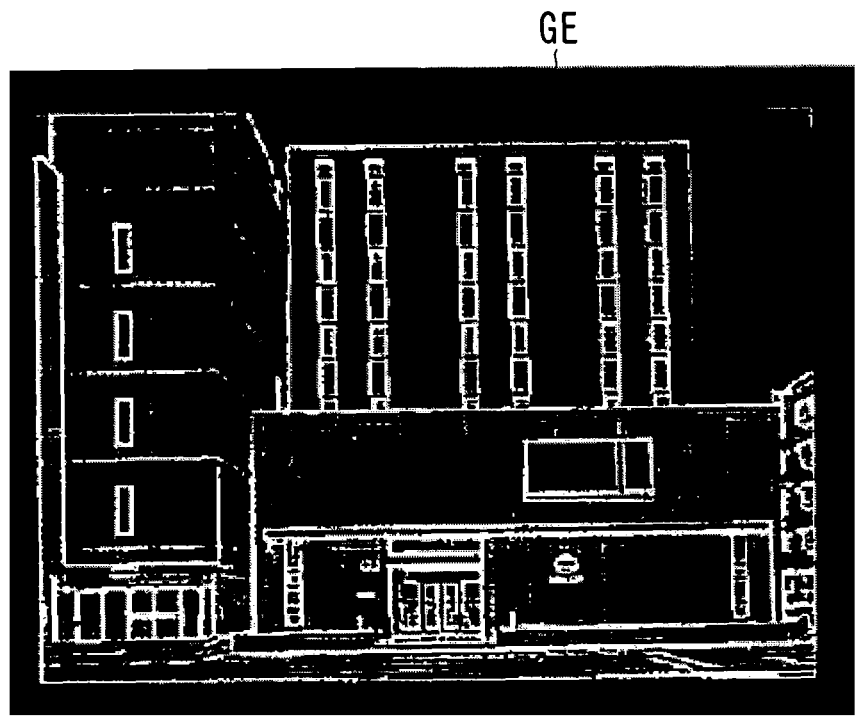
FIGS. 6A and 6B are diagrams showing examples of an edge image.
Figure 6B:
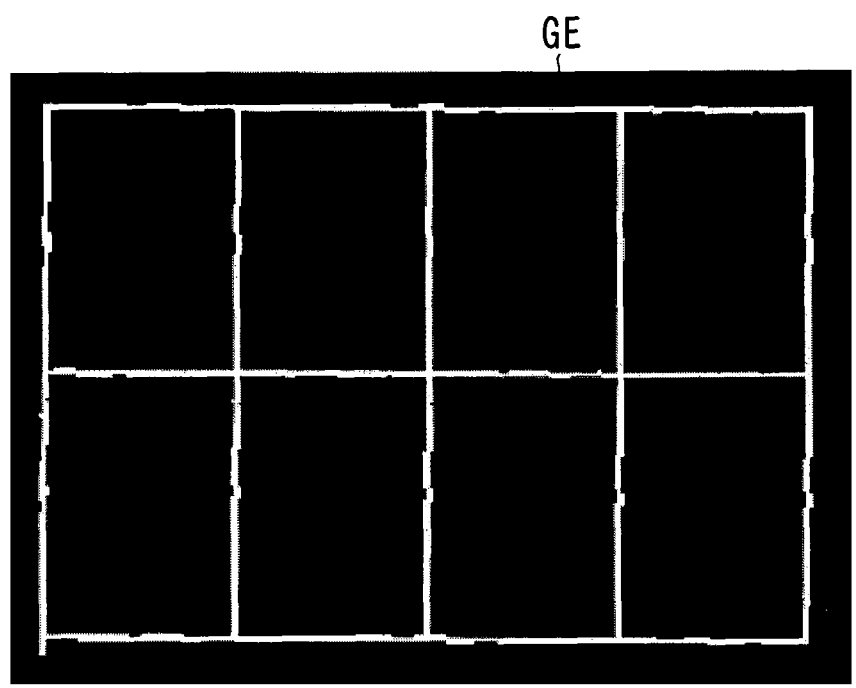

FIG. 6A shows an edge image that is generated based on an image of a photograph of a building. FIG. 6B shows an edge image that is generated based on an image showing a table. In FIGS. 6A and 6B, edge portions in the image are shown by undotted white pixels (white pixels), and other portions are shown by black pixels.

Thus, an edge original image GE that is an edge image corresponding to the first original image GG is generated.

The edge original image GE generated here is used in the subsequent process. Although it is considered to use a binary image, using the edge image is more advantageous than using a binary image in that the process can be performed at higher speed.

The inclination correcting portion 72 detects inclination of a whole edge original image GE or an image in the block AK and corrects the inclination. This inclination correction is performed for improving accuracy of the next process performed by the ruled line removing portion 73 for removing ruled lines. The inclination correction will be described in detail later in the section [Structure of the test processing portion].

The ruled line removing portion 73 performs a process (a ruled line removing process) for removing ruled lines from the edge original image GE so that characters included in the edge original image GE are separated from the ruled lines. This process is performed as follows, for example.

First, the number of white pixels that are continuous in the lateral direction (the horizontal direction) is determined from the edge original image GE in each position (coordinate position) in the longitudinal direction (vertical direction). If the determined number is more than or equal to a predetermined threshold value, the white pixels of the number are regarded as a ruled line that is drawn in the lateral direction and are removed from the edge original image GE. In other words, the white pixels are converted into black pixels. In the same manner, a ruled line drawn in the longitudinal direction is also removed.

This ruled line removing process is performed for improving accuracy of the next process performed by the character test portion 74 for testing characters.

The character test portion (the character connecting portion) 74 decides whether an image within the block AK shows characters (i.e., the block AK includes characters) by using the edge original image GEb after the ruled line removing process. For example, the decision is performed by using the edge image of a part corresponding to the block AK in the edge original image GEb based on a ratio of pixels in the edge portion to pixels in the block AK.

In the method of such decision whether or not the characters are included (character test), a threshold value that is used for the decision or the like is changed in accordance with the attribution of the block AK tested by the test processing portion 53. It is because contents of the image in the block AK cause change of feature of the characters included therein.

For example, an image showing a table often includes characters arranged in a row, while an image showing a graph often includes one independent character or characters of words at most in length. Therefore, as to the block AK that is decided to be a "table area", a process that is suitable for testing characters by the line is performed. As to the block AK that is decided to be a "graph area", a process that is suitable for testing characters by the word is performed.

In addition, it is difficult to test characters in a photographic image. Therefore, if the attribution of the block AK is decided to be a "photograph area", the character test is not performed. If the character test is performed for a photographic image, non-character may be decided to be a character so that deterioration of image quality may be caused.

Therefore, a test result in the test processing portion 53 may affect accuracy of test in the character test portion 74.

In addition, the character test portion 74 supplies a block data DK (hereinafter may be referred to as a "character block data DKM") of a block AK that is decided to include characters (hereinafter may be referred to as a "character block AKM") to the halftone dot removing portion 75. In addition, it supplies a block data DK (hereinafter may be referred to as a "non-character block data DKH") of a block AK that is not decided to include characters (hereinafter may be referred to as a "non-character block AKH") to the non-character block integration portion 18.

The halftone dot removing portion 75 removes halftone dots from the block image shown in the character block data DKM by using a known method.

The binary process portion 76 performs a binary process on the block image after the halftone dot removal. Thus, characters and background thereof in the block image are separated.

The color determination portion 77 obtains a color image of a part corresponding to the character block AKM in the original image GGb and determines color of the characters (block character color) and color of the background (block background color) included in the character block AKM by using the obtained color image. The data indicating the determined color is added to the character block data DKM of the character block AKM. Note that it is possible to use not the original image GGb but the original image GG before the preprocess.

With reference to FIG. 3 again, the character block integration portion 16 performs a process for integrating a plurality of character block data DKM that have a relationship satisfying a predetermined condition into one character block data DKM. Here, with reference to FIGS. 7A to 7D, this integration process will be described.

FIGS. 7A to 7D shows character block AKM1, AKM2, and so on including characters such as "A", "B", "C", "D" and "E". Furthermore, in FIGS. 7A to 7D, the block positions of the character blocks AKM are indicated as $(x_1, y_1)$, $(x_2, y_2)$, and so on using X coordinate in the lateral direction and Y coordinate in the longitudinal direction of the pixel with the origin at the upper left end of the original image GG. In addition, the block sizes thereof are indicated as $(a_1, b_1)$, $(a_2, b_2)$, and so on in the form of "(longitudinal length, lateral length)."

Figure 7A:
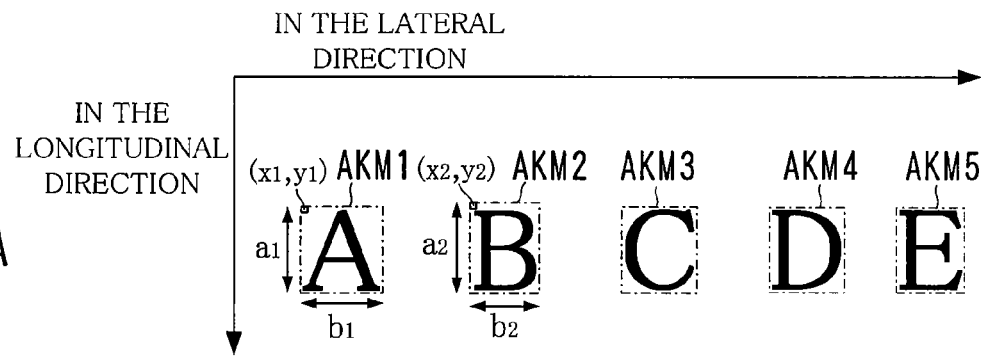
FIGS. 7A to 7D are diagrams for explaining block integration.

Here, the case is considered where the character block data DKM1 of the character block AKM1 and the character block data DKM2 of the character block AKM2 shown in FIG. 7A are integrated. This integration is performed in the following procedure.

Figure 7B:
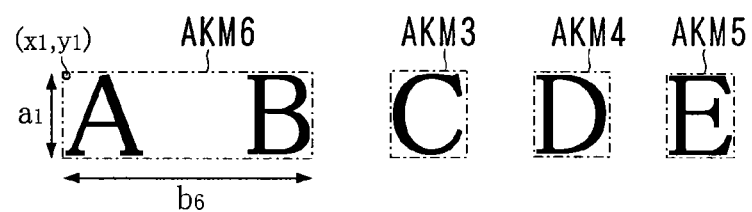

First, a rectangular area including the character block AKM1 and the character block AKM2 is detected. Thus, a character block AKM6 shown in FIG. 7B is detected. Next, weighted averages of the block character color and the block background color indicated in the character block data DKM1 and the character block data DKM2 are obtained, and they are made to be the block character color and the block background color of the character block AKM6 after the integration. Then, character block data DKM6 indicating images included in the character block AKM6, the obtained block character color, the obtained block background color, the block position $(x_1, y_1)$ of the character block AKM6 and the block size $(a_1, b_6)$ is generated. When the new character block data DKM6 is generated, the integration is completed.

Figure 7C:
Figure 7D:
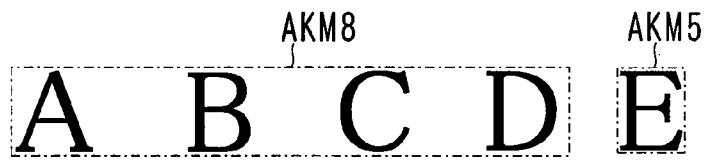

The character block integration portion 16 further repeats the above-mentioned integration process on the character block data DKM that remains after the integration. For example, when the character block data DKM of the character block AKM3 and that of the character block AKM4 shown in FIG. 7B are integrated, the character block data DKM7 of the character block AKM7 is generated as shown in FIG. 7C. Further, when the character block data DKM of the character block AKM6 and that of the character block AKM7 shown in FIG. 7C are integrated, the character block data DKM8 of the character block AKM8 is generated as shown in FIG. 7D. When the integration is performed in the example shown in FIGS. 7A to 7D, the number of character block data DKM, i.e., the number of character blocks AKM is reduced from five to two. When the number of character block data DKM is reduced, data quantity of a PDF file that will be generated later is reduced.

Note that although the example of integration with respect to the character blocks AKM aligned in the lateral direction is shown in FIGS. 7A to 7D, integration in the longitudinal direction or in a diagonal direction can be performed by the same procedure.

With reference to FIG. 3 again, the lossless compression portion 17 obtains the character block data DKM that has remained after the integration process performed by the integration processing portion 15 and compresses the block image indicated in it by a lossless compression method (performs the lossless compression). Then, it produces a character block data DKM including a compressed block image. Note that the MMR format is used as the lossless compression format in the present embodiment.

The non-character block integration portion 18 performs a process of integrating a plurality of a non-character block data DKH that have a relationship satisfying predetermined condition into one non-character block data DKH. The integration method is the same as the case of the character block integration portion 16.

The resolution converting portion 19 performs a process of reducing resolution on the block image indicated in the non-character block data DKH.

The lossy compression portion 20 performs a lossy compression on the block image of the non-character block data DKH after the process of reducing resolution and produces the non-character block data DKH including a compressed block image. Note that the JPEG format is used as the lossy compression format in the present embodiment.

The file generating portion 21 performs a process for generating a PDF file by using the character block data DKM and the non-character block data DKH that are produced by the lossless compression portion 17 and the lossy compression portion 20, respectively.

[Structure of the Test Processing Portion]

Next, the process of each portion of the test processing portion 53 shown in FIG. 8 will be described.

Figure 8:
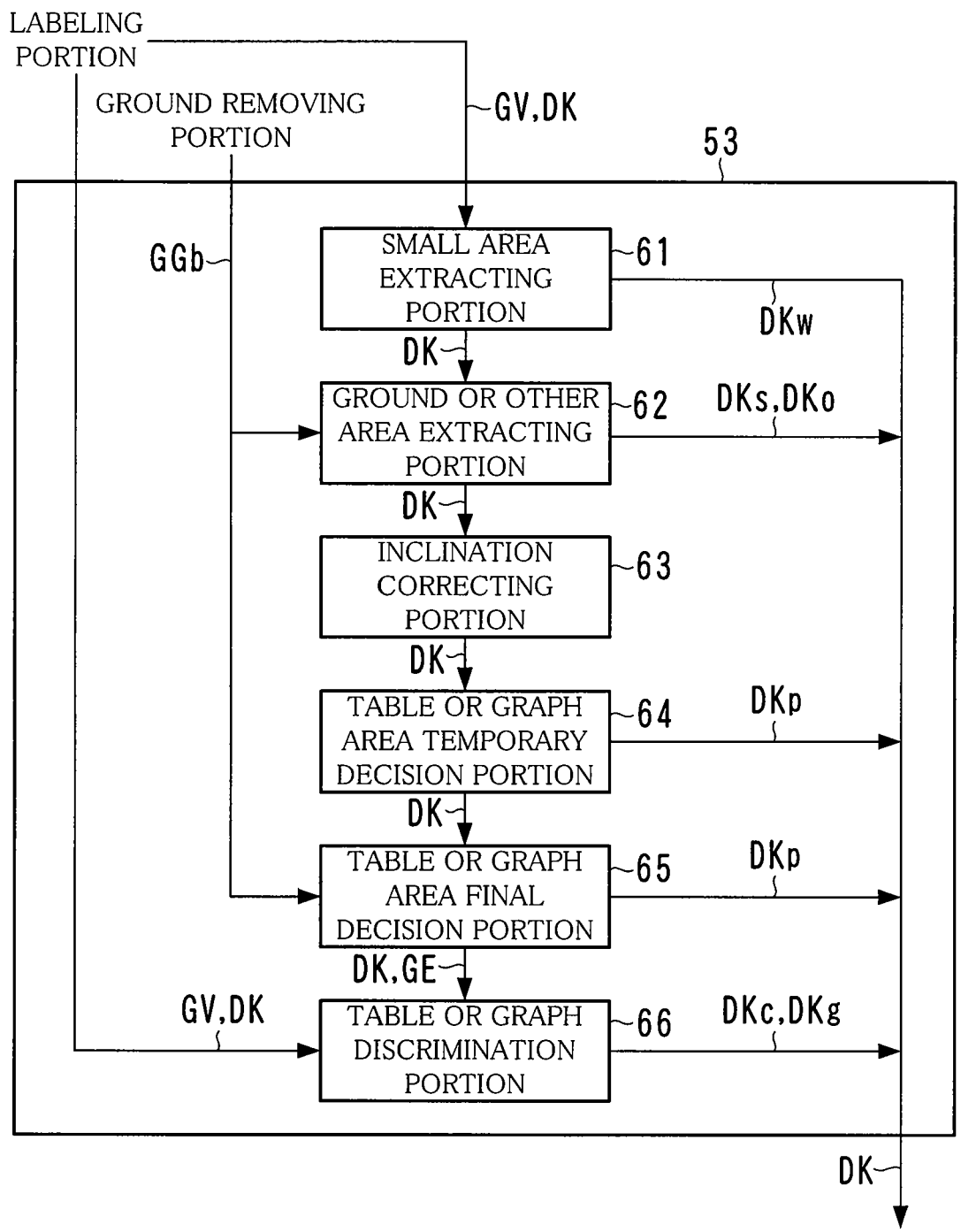
FIG. 8 is a diagram showing an example of a structure of a test processing portion.

As shown in FIG. 8, the test processing portion 53 is made up of a small area extracting portion 61, a ground or other area extracting portion 62, an inclination correcting portion 63, a table or graph area temporary decision portion 64, a table or graph area final decision portion 65, a table or graph discrimination portion 66 and the like.

The small area extracting portion 61 performs a process for deciding a block AK that is defined with respect to a partial image of a small character or a frame line (an attribution of the block AK) to be a small area and for extracting the block data DK of the block AK. This process is performed as follows.

First, the block data DK are obtained, and one block data DK to be processed is selected. A block size indicated in the selected block data DK is obtained. It is determined whether or not both the longitudinal and lateral lengths of the block AK that is a process target are smaller than or equal to 250 pixels based on the obtained block size. If they are smaller than or equal to 250 pixels, it is determined whether or not a labeling ratio of the block AK is more than or equal to 70%. This labeling ratio is calculated by the following expression by using "k" that is the number of labeling pixels in the block AK, "a" that is a longitudinal length of the block AK, and "b" that is a lateral length of the same.

$$\text{labeling ratio} = (k/(a \times b)) \times 100 \qquad (1)$$

If the labeling ratio is more than or equal to 70%, the block AK is decided to be the small area.

Furthermore, this decision process is performed on all the blocks AK so that the block data DK of the block AK that is decided to be a small area (block data DKw) is extracted.

Note that a data indicating that the block AK is a small area is added to the block data DKw to be extracted on this occasion.

According to the above-mentioned process, the block AK with respect to a small character or the like can be decided to be a small area appropriately. It is because the rectangular area with respect to a partial image that indicates a small character or the like is tending to have a small block size and a high labeling ratio, so its characteristic (characteristic quantity) can be utilized for recognizing that it is a rectangular area with respect to a partial image indicating a small character or the like.

Thus, the block AK with respect to the partial image that indicates a small character or the like is excluded from a target of decision process performed by the ground or other area extracting portion 62 and subsequent process.

Note that it is possible to extract the block data DKw with respect to the small area in advance when the process is performed by the preprocess portion 13.

The ground or other area extracting portion 62 performs a process for deciding the block AK that is defined with respect to a partial image that indicates a ground, a large character or the like to be a ground area or other area and for extracting the block data DK of the block AK. Note that a target of the process here is a block data DK that has remained without being extracted in the process performed by the small area extracting portion 61.

Figure 9:
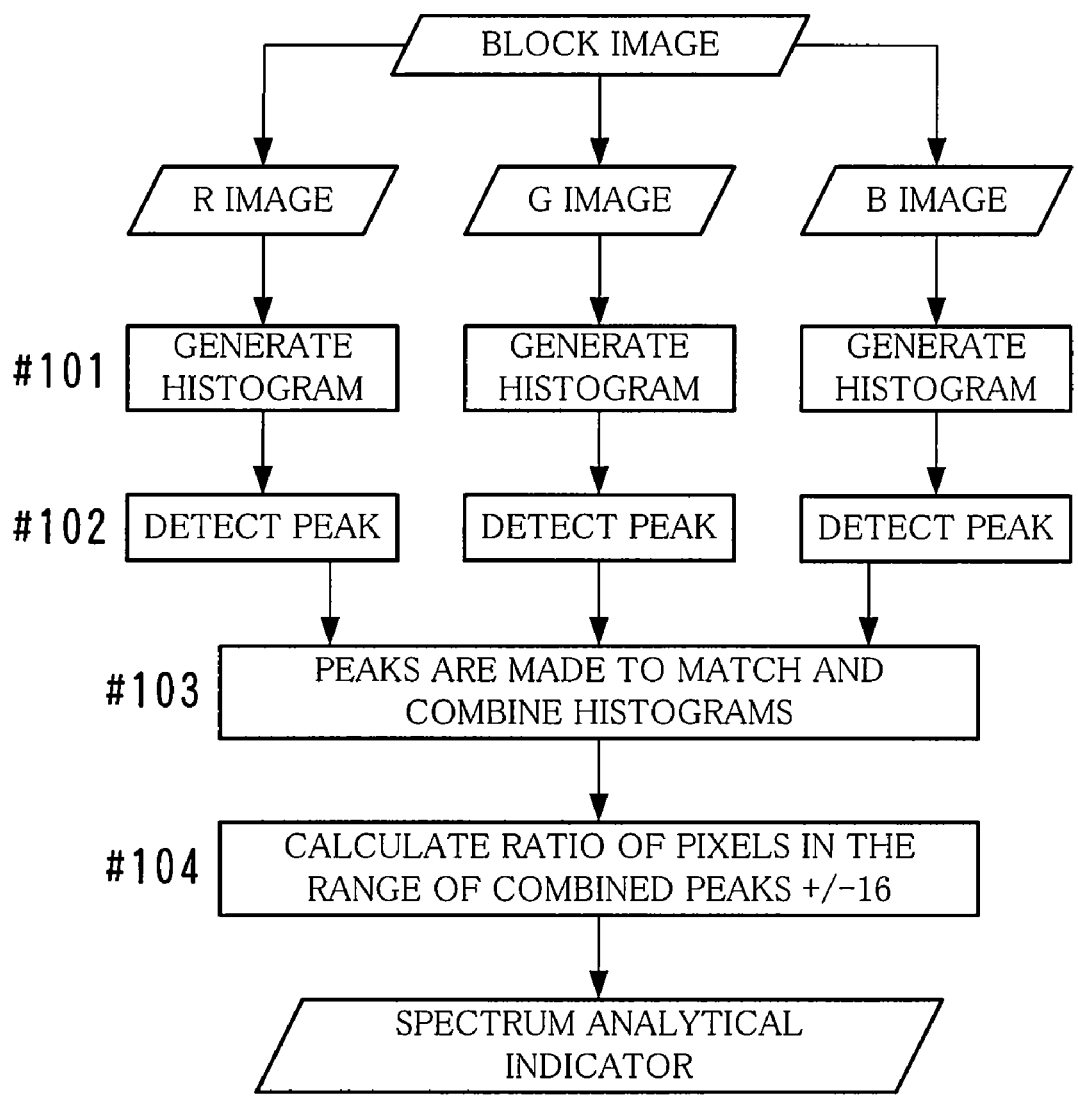
FIG. 9 is a diagram for explaining a method of a decision process for a ground or other area.

On this occasion, it is decided first whether or not the block AK is a ground area or other area for each block AK. This decision is performed in the procedure as shown in FIG. 9.

First, block data DK that have remained without extracted in the process performed by the small area extracting portion 61 are obtained, and one block data DK to be processed is selected. A block image indicated in the selected block data DK (a color image at this time point) is obtained, and a histogram as shown in FIG. 10A is generated based on the block image for each of the RGB (#101 in FIG. 9).

Figure 10:
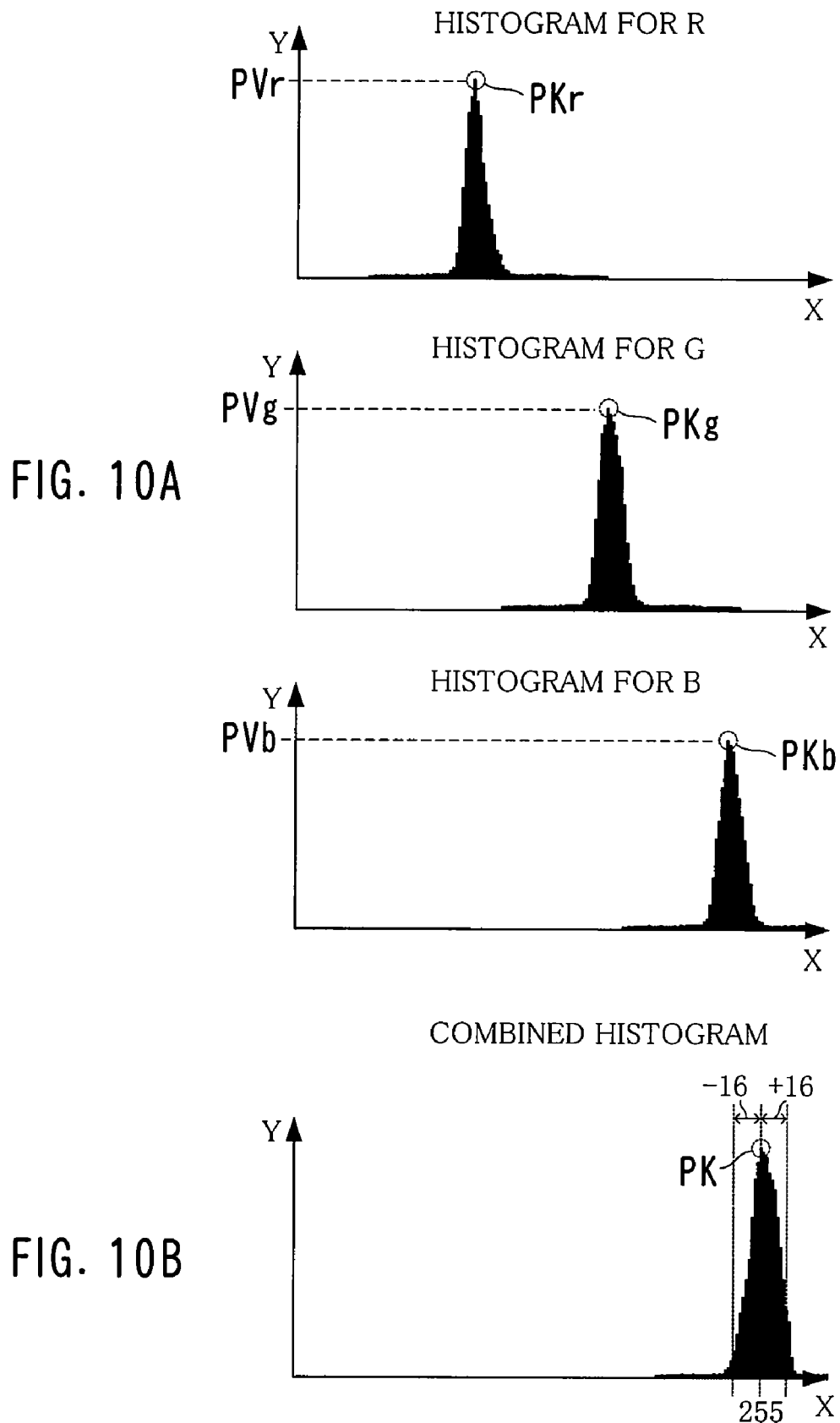
FIGS. 10A and 10B are diagrams showing an example of a histogram that is generated at the time of a decision process for the ground or other area.

In FIGS. 10A and 10B, the X-axis of the histogram indicates a density value of a pixel. The Y-axis indicates the number of pixels of the density value indicated by the X-axis in the block AK. When this histogram is generated, the block AK is scanned in the longitudinal direction (sub scanning direction) and in the lateral direction (main scanning direction) with smoothing into ⅛ so that the number of each density value is determined for each of the RGB. More specifically, a density value of a pixel is obtained every eight pixels, and the number is counted up with respect to the density value. The obtained number is summed up for each of the RGB so as to generate the histogram. The smoothing into ⅛ with compression enables exclusion of halftone dots that hardly shows a sharp peak, a single color line drawing or the like.

In the generated histograms, points (peaks) PKr, PKg and PKb of maximum values (peak values) PVr, PVg and PVb of the number are obtained (#102). In each histogram, the X coordinate of the obtained peak PK is made to match "255". In other words, the entire of the histogram is moved in parallel so that a column of the histogram having the number that is the peak value PV is positioned at the place of the density value "255". Then, the moved histograms are combined (summed up) (#103). Thus, a combined histogram as shown in FIG. 10B is generated.

Then, it is determined whether or not ⅔ (approximately 66%) of pixels in the entire block AK are concentrated in the range of +/−16 with respect to the X coordinate ("255") of the peak PK in the combined histogram. In other words, it is determined whether or not the number of pixels (the pixel number) within the range of +/−16 is more than or equal to 66% of the number of all the pixels (dimension of histogram). If the former number is more than or equal to 66% of the latter number, the block AK is decided to be a ground area or other area. Note that the histogram is generated with smoothing into ⅛ in the present embodiment. Therefore, "the number of all the pixels" in this case means ⅛ of the total number of pixels in the block AK.

Next, discrimination whether each of the blocks AK that were decided as described above is a ground area or other area is performed. When this discrimination is performed, a labeling ratio (a ground ratio) of each block AK is obtained first by the expression (1) that was already described above.

A block AK in which the obtained labeling ratio is more than or equal to 90% is discriminated to be a ground area, while a block AK in which the obtained labeling ratio is less than 90% is discriminated to be other area.

The above-mentioned process is performed with respect to all the blocks AK of the block data DK that were not extracted by the small area extracting portion 61. Then, the block data DKs that is a block data DK of the block AK discriminated to be a ground area and the block data DKo that is a block data DK of the block AK discriminated to be other area are extracted and excluded from a target of subsequent decision process.

Furthermore, on this occasion, a data indicating that the block AK is a ground area is added to the block data DKs, and a data indicating that the block AK is other area is added to the block data DKo.

According to the process described above, the block AK about the partial image that indicates a ground or a large character can be decided to be a ground area or other area appropriately. It is because the labeling pixel of the ground is made up of a single color in many cases, and a partial image about a large character or the like has a large construction ratio of a single color, so that the characteristic of them can be extracted by the histogram. Note that if ⅔ of all pixels are concentrated in ⅛ section of a spectrum scale, it is usually decided to be a ground area or other area.

Figure 11:
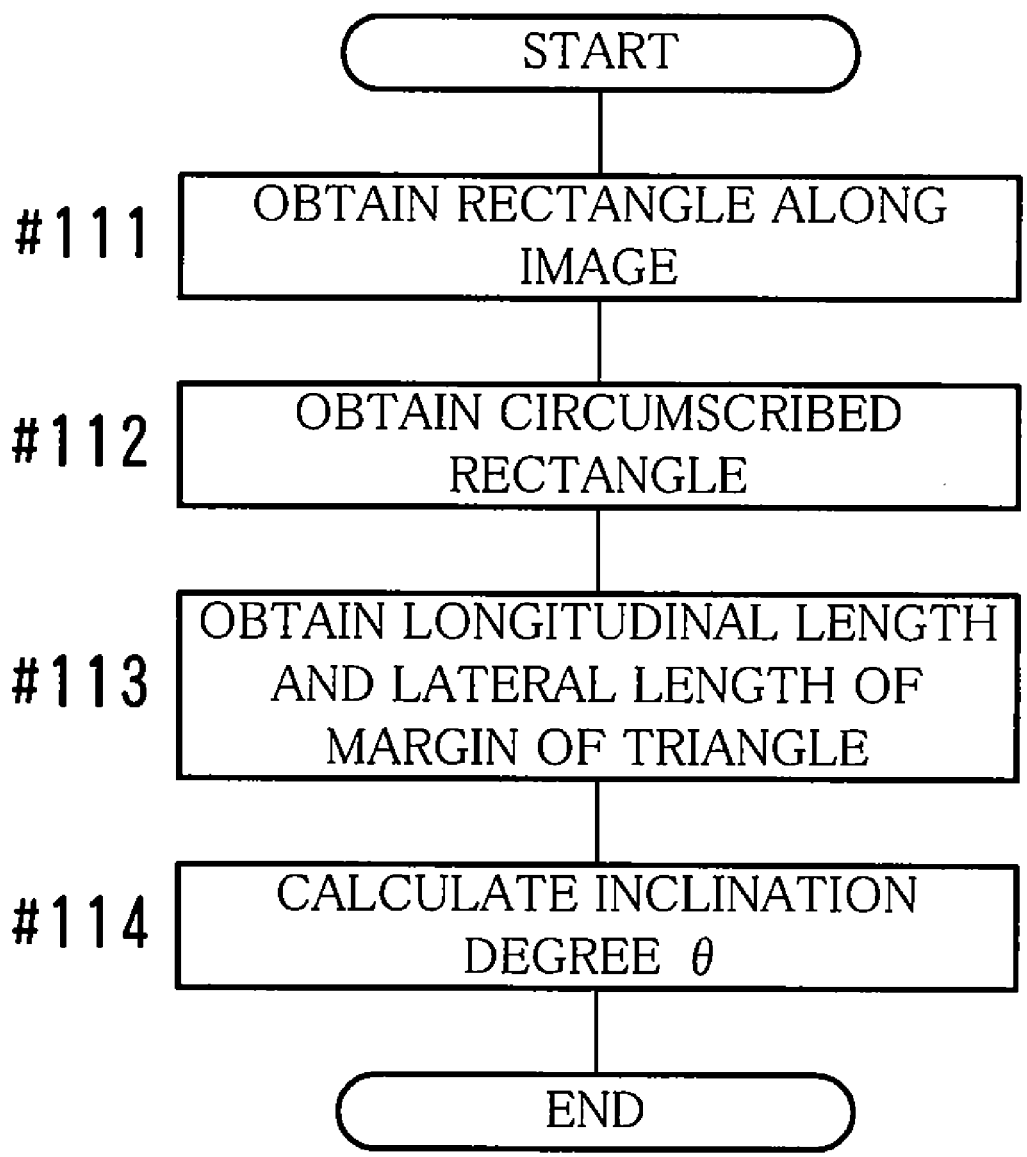
FIG. 11 is a flowchart for explaining a flow of a process of inclination detection in inclination correction.

The inclination correcting portion 63 performs a process (inclination correction) for correcting inclination of an image that is included in the block AK of the block data DK that has remained without being extracted in the process performed by the ground or other area extracting portion 62. In this case, the inclination is detected first and its inclination degree is obtained in the procedure as shown in FIG. 11.

Figure 12:
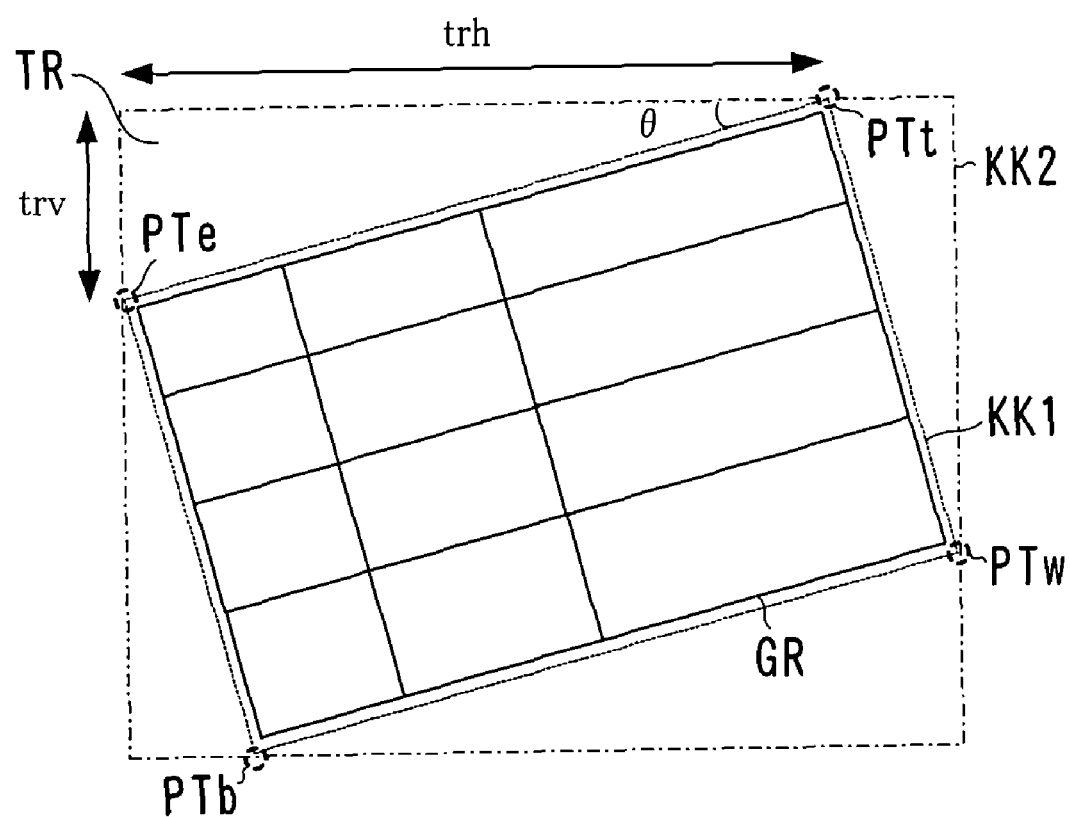
FIG. 12 is a diagram for explaining inclination detection.

First, a rectangle KK1 as shown in FIG. 12 along the image made up of the labeling pixels (hereinafter referred to as "labeling image GR") is obtained (#111 in FIG. 11). When this rectangle KK1 is obtained, positions of a pixel PTt that is located at the upper end side, a pixel PTb that is located at the lower end side, a pixel PTe that is located at the left end side and a pixel PTw that is located at the right end side are detected in the labeling image GR, for example. A straight line connecting the pixel PTt with the pixel PTe, a straight line connecting the pixel PTe with the pixel PTb, a straight line connecting the pixel PTb with the pixel PTw, and a straight line connecting the pixel PTw with the pixel PTt are obtained respectively based on the detected positions. Then, the area enclosed by the straight lines is defined as the rectangle KK1.

After the rectangle KK1 is obtained, a circumscribed rectangle KK2 that circumscribes the rectangle KK1 is obtained (#112). A longitudinal length and a lateral length (the number of pixels) of a triangle TR of a margin part defined by the circumscribed rectangle KK2 and the rectangle KK1 is obtained (#113).

Based in the obtained longitudinal length (trv) and lateral length (trh), an inclination degree θ of the rectangle KK1 is obtained from the following expression (#114).

$$\theta = \tan^{-1}(trv/trh) \quad (2)$$

Figure 13:
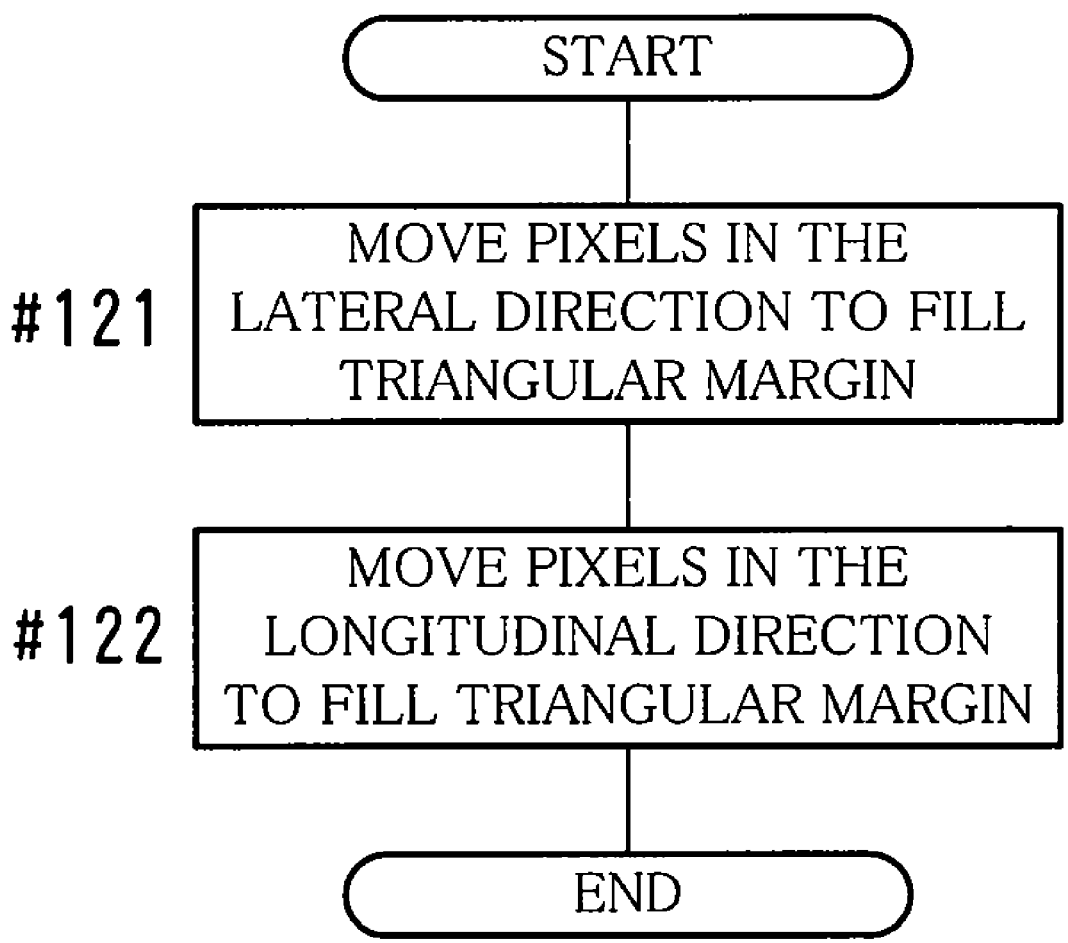
FIG. 13 is a flowchart for explaining a flow of a process of the inclination correction.

Next, based on the obtained inclination degree θ, a process for correcting the inclination is performed in the procedure as shown in FIG. 13.

Figure 14A:
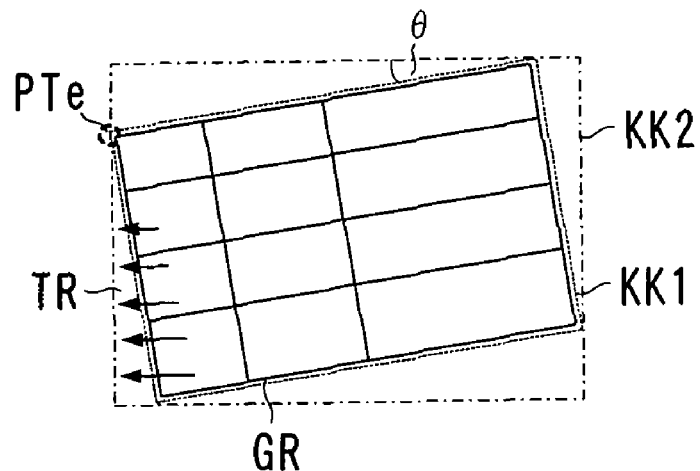
FIGS. 14A to 14C are diagrams for explaining a method of the inclination correction.

First, as shown in FIG. 14A, the labeling pixels of the labeling image GR are moved in parallel in the lateral direction by the length such that the left side of the rectangle KK1 becomes along with the left side of the circumscribed rectangle KK2 (#121 in FIG. 13). This length can be obtained from a position of each labeling pixel in the longitudinal direction and the inclination degree θ with respect to a position of the pixel PTe as the origin.

Figure 14B:
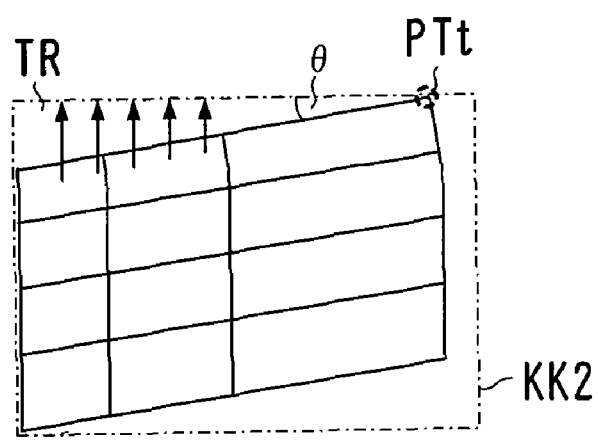
Figure 14C:
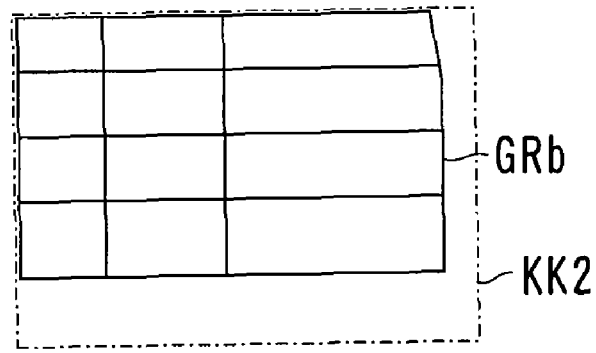

Moreover as shown in FIG. 14B, each of the labeling pixels is moved in parallel in the longitudinal direction by the length such that the upper side of the rectangle KK1 becomes along with the upper side of the circumscribed rectangle KK2 (#122). This length can be obtained from a position of each labeling pixel GR in the lateral direction and the inclination degree θ with respect to a position of the pixel PTt as the origin. In other words, pixels are moved in the longitudinal and the lateral directions so as to fill in the margin of the triangle TR so that the inclination can be corrected. Thus, a labeling image GRb after inclination is corrected as shown in FIG. 14C is obtained.

The table or graph area temporary decision portion 64 performs a process for temporarily deciding the block AK defined with respect to a partial image that shows a table or a graph to be a table or graph area. This process is performed as follows.

First, block data DK after the inclination correction process by the inclination correcting portion are obtained. Then, one block data DK to be processed is selected. The edge portion of the block image (color image) shown in the selected block data DK is extracted so that an edge image corresponding to the block image (hereinafter referred to as a "block edge image BE") is generated.

Although here is described an example of the case where the block edge image BE is obtained by extracting the edge portion from the block image (generating the edge image), another method may be adopted for obtaining the block edge image BE. For example, it is possible to generate the edge original image GE in advance and to extract the edge image of a part corresponding to the block AK to be processed from the edge original image GE for obtaining the block edge image BE with respect to the block AK.

In addition, although the example of the edge image in which the edge portion is indicated by white pixels while other portion is indicated by black pixels is shown in FIGS. 6A and 6B, here is described the reversed edge image thereof for simplifying the description, i.e., the edge image in which pixels constituting the edge portion (edge pixels) are shown with black pixels while other portion is shown with white pixels.

Figure 15:
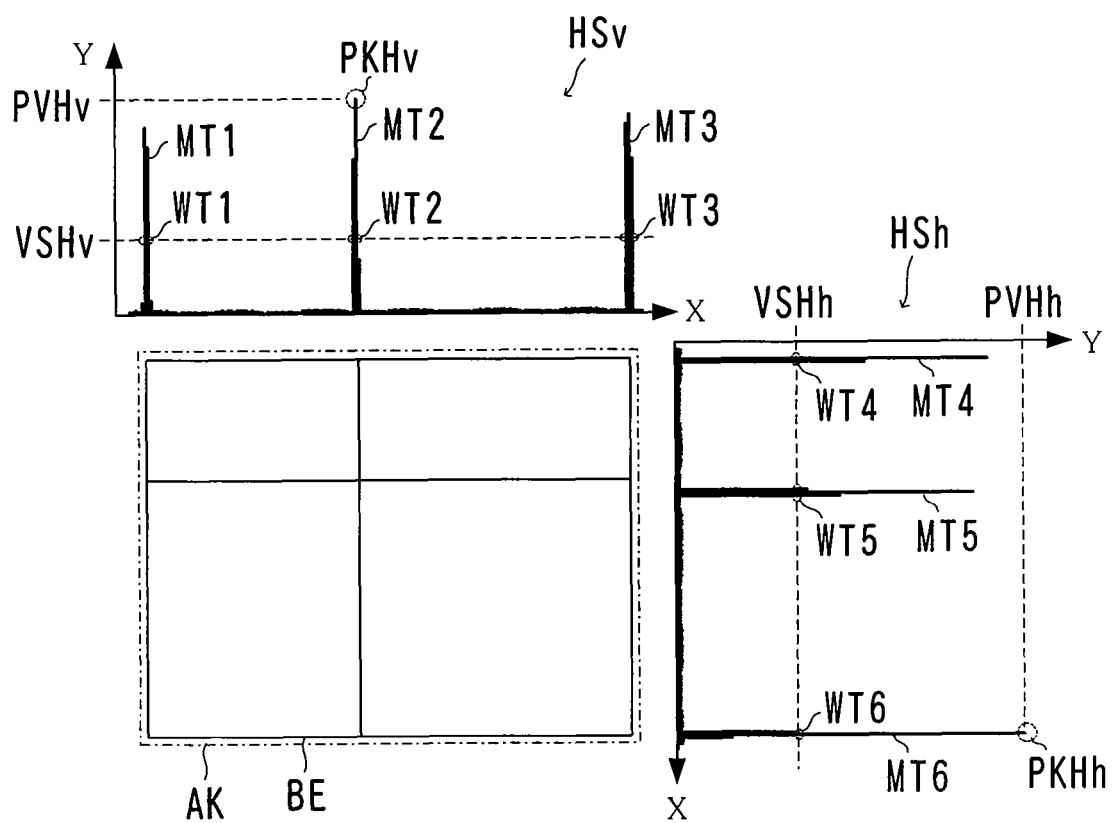
FIG. 15 is a diagram showing an example of a histogram for an image that indicates a table.

Using the generated block edge image BE, histograms as shown in FIG. 15 are generated. FIG. 15 shows a histogram HSv extending in the longitudinal direction and a histogram HSh extending in the lateral direction in the case where the block edge image BE is an edge image showing a table. Here, the X-axis of the histogram HSv indicates a position (coordinate) of a pixel in the lateral direction in the block AK. The Y coordinate indicates the number of black pixels arranged in the longitudinal direction at each position indicated in the X-axis. The X-axis of the histogram HSh indicates a position (coordinate) of a pixel in the longitudinal direction in the block AK. The Y coordinate indicates the number of black pixels arranged in the lateral direction at each position indicated in the X-axis.

A peak PKH is detected from each of the generated histograms HS, so that a maximum value (peak value PVH) of the histogram is obtained. Values corresponding to 33% of the peak values PVHv and PVHh are obtained, and the values are made to be threshold values VSHv and VSHh of the histograms HS.

A mountain MT having an extreme value that exceeds the threshold value VSH is detected with respect to each of the histograms HSv and HSh, and the numbers thereof are obtained and summed up. Furthermore, widths WT of the detected mountains MT at a position of the threshold value VSH are obtained. Here, a method of obtaining the width WT will be described with an example of the case of the histogram HS as shown in FIG. 16.

Figure 16:
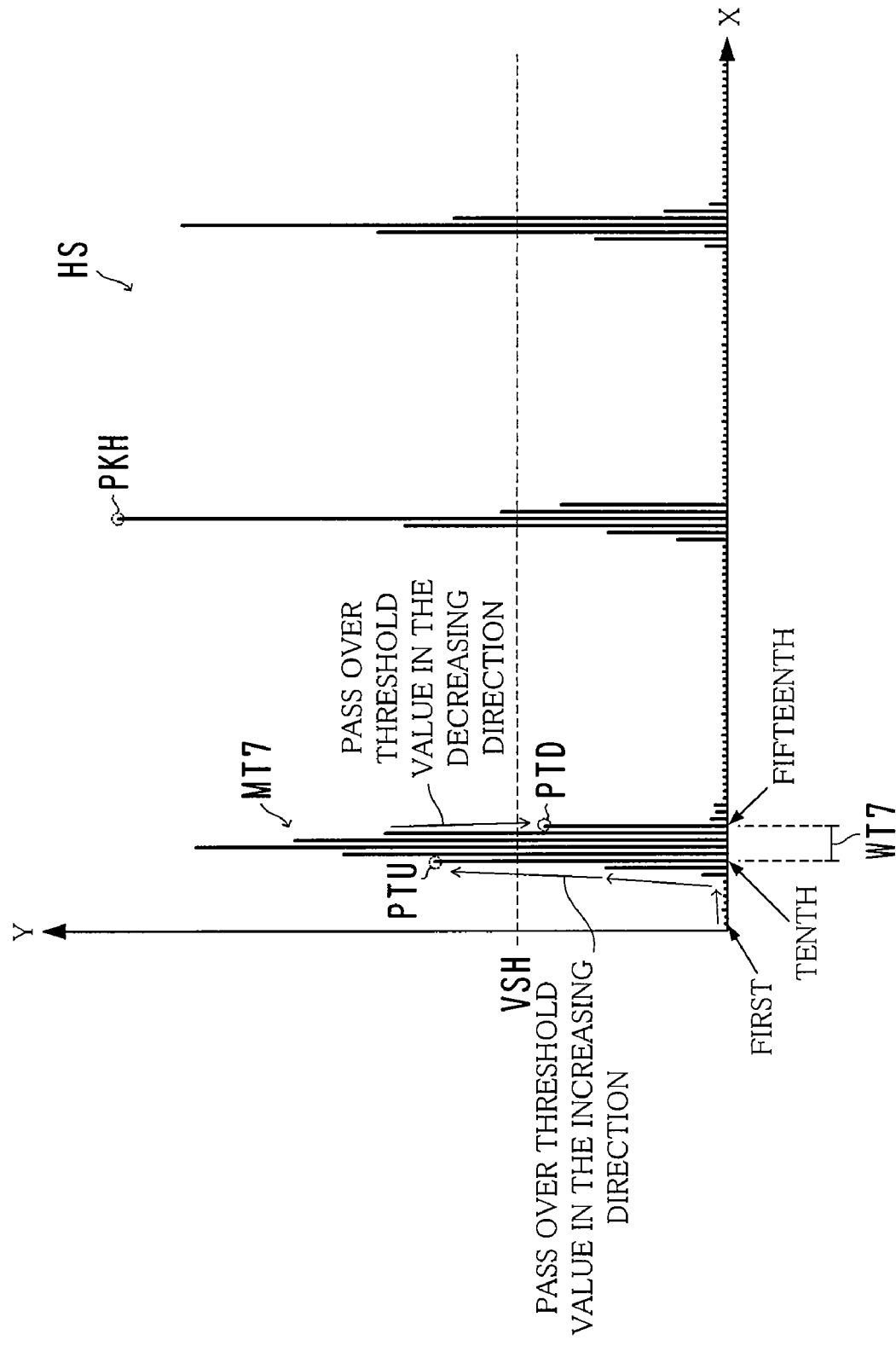
FIG. 16 is a diagram for explaining a method of determining a width of a mountain in a histogram.

In FIG. 16, the histogram is traced from the position of the X coordinate (line number) "1" in the positive direction of the X coordinate. A line number of a point PTU when passing over the threshold value VSH in the increasing direction is recorded. Further, the histogram is traced. When passing over the threshold value VSH in the decreasing direction, a line number of a point PTD is obtained. A difference between the obtained line number and recorded line number is calculated, and the difference is made to be a width WT of the mountain MT.

In the example shown in FIG. 16, the line number when passing over in the increasing direction is "10", and the line number when passing over in the decreasing direction is "15". Therefore, the width WT7 of the mountain MT7 is "15".

In addition, the histogram is traced to the end of the line number (the end of the X coordinate), so that the width WT is obtained with respect to all the mountains MT that exceed the threshold value VSH.

In this way, the width WT of mountains MT that exceed the threshold value VSH is obtained with respect to each of the histograms HSv and HSh.

After the width WT is obtained, a variance value of the width WT is calculated next with respect to each of the histograms HSv and HSh. Note that it is possible to obtain one integrated variance value with respect to the histograms HSv and HSh.

Then, if a total sum of the obtained numbers of mountains MT is "five" or more and each of the variance values of the widths WT is smaller than "10", the block AK is decided to be a table or graph area temporarily.

In the same manner, the above-mentioned process is performed on the blocks AK of all the block data DK that are not extracted by the ground or other area extracting portion 62. Then, the block AK that was not decided temporarily to be a table or graph area is decided to be a photograph area, and the block data DKp that is a block data DK thereof is extracted. Note that a data indicating that the block AK is a photograph area is added to the block data DKp in this case.

If the block edge image BE is an image indicating a table, a plurality of edge lines are generated in the block edge image BE due to ruled lines of the table as shown in FIG. 15. Therefore, the histogram thereof has a plurality of mountains MT having some extent of height. In addition, since they are mountains made up of edge lines, widths (shapes) thereof have little variation.

Figure 17:
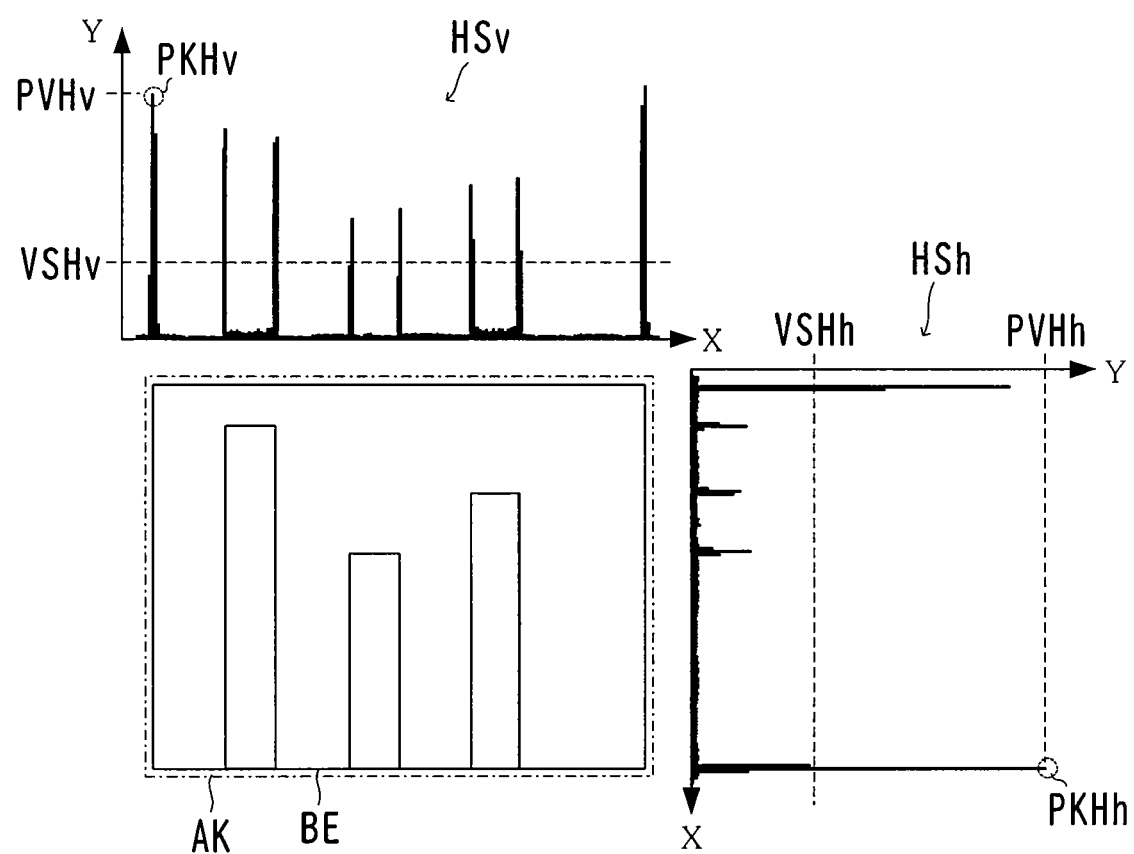
FIG. 17 is a diagram showing an example of a histogram for an image that indicates a graph.

If the block edge image BE is an image showing a graph, a block edge image BE as shown in FIG. 17 for example is generated. In this case similarly to the case of the table, since a plurality of edge lines are generated there, a histogram HS is formed that shows a plurality of mountains MT having some extent of height and substantially uniform width (shape).

Figure 18:
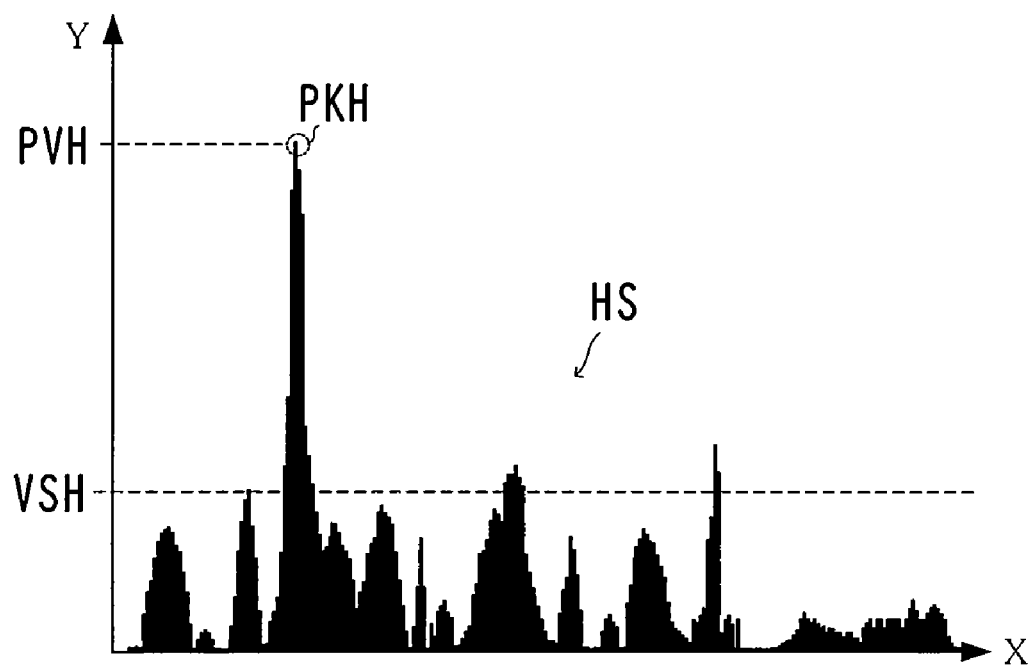
FIG. 18 is a diagram showing an example of a histogram for an image of a photograph.

On the contrary, if the block edge image BE is a photographic image, there are fewer line components (ruled lines) than a table or a graph in many cases. Therefore, a histogram HS showing a plurality of mountains MT having small height and a variation of width is formed as shown in FIG. 18, for example.

Thus, it is possible to discriminate appropriately whether the block AK is a table or graph area or a photograph area by making a decision based on the number of mountains MT having height more than or equal to the threshold value VSH and a variance value of the width WT of the mountain MT.

Figure 19:
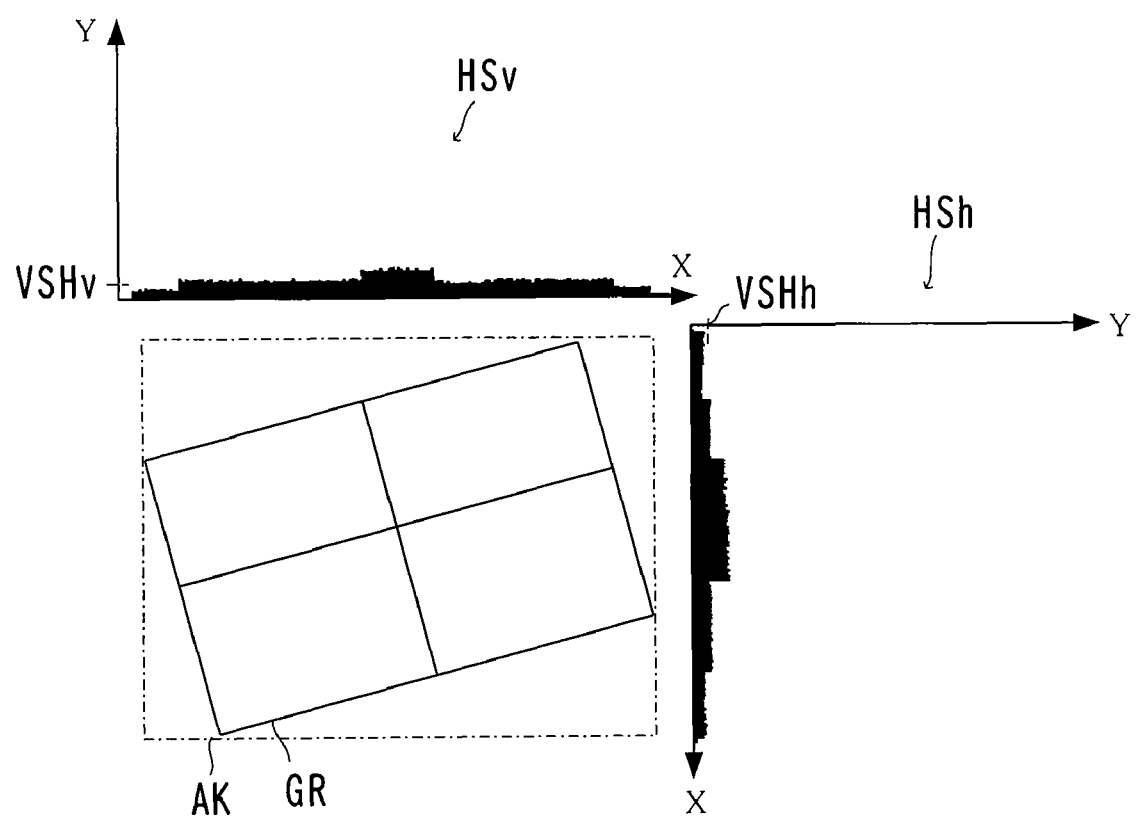
FIG. 19 is a diagram showing an example of a histogram in the case where an image that indicates a table is inclined.

In the present embodiment, the inclination correction is performed prior to the process performed by the table or graph area temporary decision portion 64. If this inclination correction is not performed, and if the block edge image BE is inclined substantially as shown in FIG. 19, overlapping of ruled lines of the table may affect creation of the histogram HS. Therefore, the mountain MT of the histogram HS becomes low, and there will be a variation of the width WT, so that the block AK cannot be decided to be a table or graph area. When the inclination correction is performed prior to the process performed by the table or graph area temporary decision portion 64, such a bad influence can be suppressed.

However, even if the inclination correction is performed, there is a case where some inclination remains. In this case, as described above in the section of the background of the invention, it is necessary to decrease the threshold value with respect to height of the mountain MT. In the case of the conventional method, it may cause increasing possibility of mistake to decide that a photographic image is an image showing a table.

In the present embodiment, judgment is made about not only the number of mountains MT having height more than or equal to the threshold value VSH but also a variance value of the width WT of the mountain MT. Since the photographic image often generates a variation of the width WT of the mountain MT of the histogram HS, it is possible to reduce possibility of mistake to decide that the photographic image is a table or graph area to some extent by making a decision based on the variance value of the width WT. Thus, even if the image has some inclination, an appropriate decision can be performed.

Note that if there is a block AK including both a table and a graph according to the process described above, it can be decided to be a table or graph area.

The table or graph area final decision portion 65 performs a process for performing decision (final decision) that the block AK decided temporarily by the table or graph area temporary decision portion 64 that satisfies a predetermined condition is a table or graph area.

First, block data DK decided temporarily by the table or graph area temporary decision portion 64 that the block AK is table or graph area is obtained, and one block data DK to be processed is selected. An edge pixel ratio (a variation ratio of the edge) of the block edge image BE indicated in the block data DK is calculated by the following method, for example.

Figure 20:
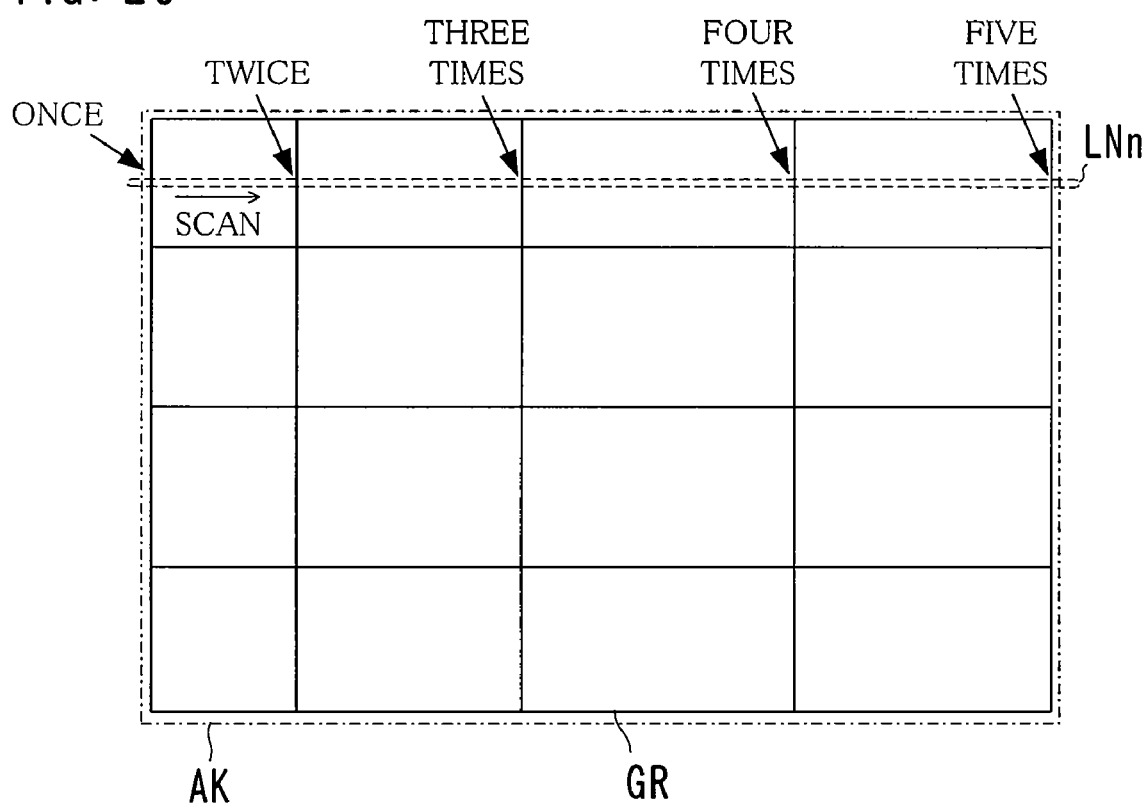
FIG. 20 is a diagram for explaining a method of determining the number of edge pixels.

The block edge image BE is scanned in the lateral direction (main scanning direction), and the number of times for the image to change from a black pixel to a white pixel is counted. The number of times is obtained with respect to each line LN (line of a row or a column having width of one pixel), and a total sum of the numbers (the number of edge pixels) is calculated. For example, in the case of a block edge image BE showing a table as shown in FIG. 20 for example, the number of times on the line LNn is "five times". Note that it is possible to count the number of times of change from a white pixel to a black pixel.

The obtained number of edge pixels is represented by "c", the longitudinal length of the block AK is represented by "a", and the lateral length of the same is represented by "b". Then, the edge pixel ratio is calculated by the following expression.

$$\text{edge pixel ratio} = (c/(a \times b)) \times 100 \qquad (3)$$

When the edge pixel ratio is obtained, it is determined next whether or not the edge pixel ratio is smaller than a predetermined threshold value. If it is smaller than the threshold value, the block AK is decided (finally) to be a table or graph area. If it is not smaller than the threshold value, the block AK is decided (finally) to be a photograph area. The decision is performed with respect to all the blocks AK of the obtained block data DK in the same manner. Then, the block data DKp of the blocks AK that were decided to be a photograph area are extracted and are excluded from a target of the subsequent process.

Note that a data indicating that the block AK is a photograph area is added to the block data DKp on this occasion.

In the present embodiment, the table or graph area temporary decision portion 64 performs the process of excluding the block AK that includes a photographic image from a target of a table or graph area.

However, some photographs may include a lot of edge portions as shown in FIG. 6A, and such a photograph may satisfy the condition of a table or graph area in the decision performed by the table or graph area temporary decision portion 64. In this case, the block AK may be decided to be a table or graph area.

Therefore in the present embodiment, the table or graph area final decision portion 65 further performs a decision process using the edge pixel ratio. As understood from FIG. 6A, when the photographic image is converted into an edge image, it includes more edge portions than the case of a table and a graph. Therefore, the block AK with respect to a photograph can be recognized by the process performed by the table or graph area final decision portion 65 as described above, and it can be excluded from a target of the table or graph area.

The table or graph area temporary decision portion 64 and the table or graph area final decision portion 65 perform two times of decision, so that accuracy of decision about the table or graph area can be improved.

The table or graph discrimination portion 66 performs the process for discriminating the block AK that was decided to be a table or graph area by the table or graph area final decision portion 65. The block AK is discriminated to be a table area or to be a graph area as follows.

First, the block data DK of the blocks AK that were decided to be a table or graph area by the table or graph area final decision portion 65 are obtained, and one block data DK to be processed is selected. Then, it is determined to what extent characters are included in an image of a part corresponding to the block AK of the block data DK (block AK to be processed) in the original image GG.

On this occasion, labeling pixels of the block AK presenting in the block AK are extracted. For example, if the target of the process is the block AK6 shown in FIG. 5, the blocks AK7, AK8, AK9, and so on presenting inside of it are extracted. The blocks AK to be extracted can be obtained based on a block position and a block size thereof, and a block position and a block size of the block AK to be processed.

Figure 21:
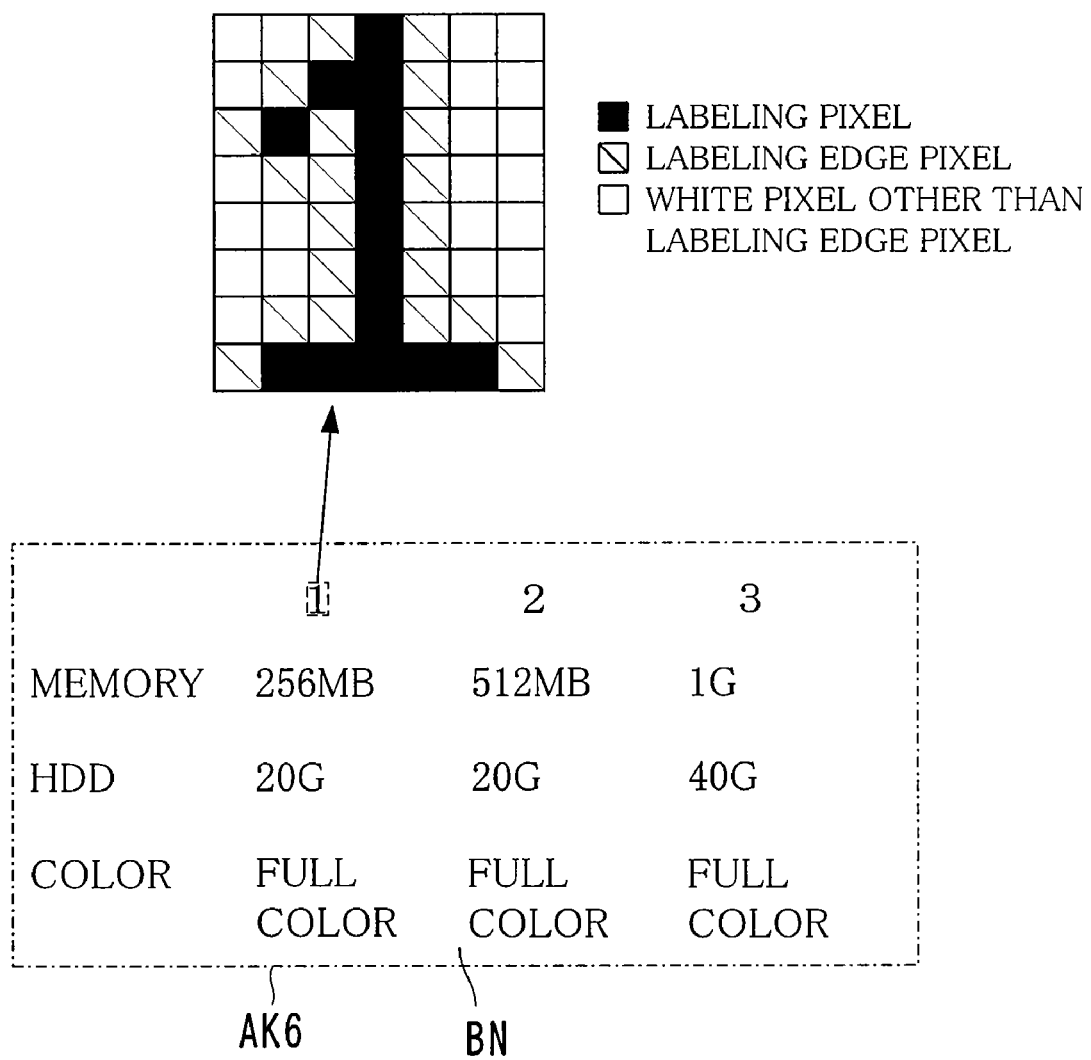
FIG. 21 is a diagram for explaining a method of determining a labeling edge pixel ratio.

Furthermore, binary images of parts corresponding to the blocks AK extracted from the binary original image GV are obtained. A target binary image BN that is an image in the case where the obtained binary images are arranged at the corresponding positions in the block AK to be processed is generated. For example, if the block AK6 is a target of the process, a target binary image BN having a range of a block size of the block AK6 as shown in FIG. 21 is generated. Note that although a pixel constituting "1" is shown as an enlarged display as an example of a pixel of the target binary image BN in FIG. 21, the process and the calculation in the whole area of the block AK6 are performed actually.

Next, the number of labeling edge pixels is determined based on the generated target binary image BN. The labeling edge pixel means a white pixel at a boundary between the labeling pixel and the white pixel. In the example as shown in FIG. 21, a pixel shown with a diagonal line is the labeling edge pixel.

Then, based on the number C1 of all the labeling edge pixels in the target binary image BN and the number C2 of other white pixels, the labeling edge pixel ratio is calculated by the following expression.

$$\text{labeling edge pixel ratio}=(C1/(C1+C2))\times 100 \quad (4)$$

Then, it is determined whether or not the calculated labeling edge pixel ratio is smaller than "5%". If the ratio is smaller than "5%", the block AK to be processed is decided to be a graph area. If the ratio is not smaller than "5%", the block AK to be processed is decided to be a table area. The decision is performed with respect to all the blocks AK of the obtained block data DK in the same manner. Then, the block data DKc that is a block data DK of the block AK that was decided to be a table area and the block data DKg that is a block data DK of the block AK that was decided to be a graph area are extracted.

According to the process described above, discrimination of a table area or a graph area can be performed appropriately. It is because the image showing a table has a tendency to include more characters than the image showing a graph.

If a lot of characters are included, there are a lot of boundaries between a character portion (a black pixel) and other portion (a white pixel) in the image in the block AK. When the labeling edge pixel ratio is determined, it can be determined whether or not there are a lot of boundaries, so that discrimination of a table area or a graph area can be performed appropriately.

Furthermore, if the character block AKM is confirmed at this time point, it can be decided from the number whether or not there are a lot of characters included in the block AK to be processed. However, since the character block AKM is not confirmed, the labeling edge pixel is used for the decision here.

Furthermore, although the binary image is used for determining the labeling edge pixel ratio in the present embodiment, it is possible to use the edge image.

Next, with reference to the flowchart shown in FIG. 22, a general process flow until a PDF file is generated with respect to the scanned original in the image forming apparatus 1 will be described.

Figure 22:
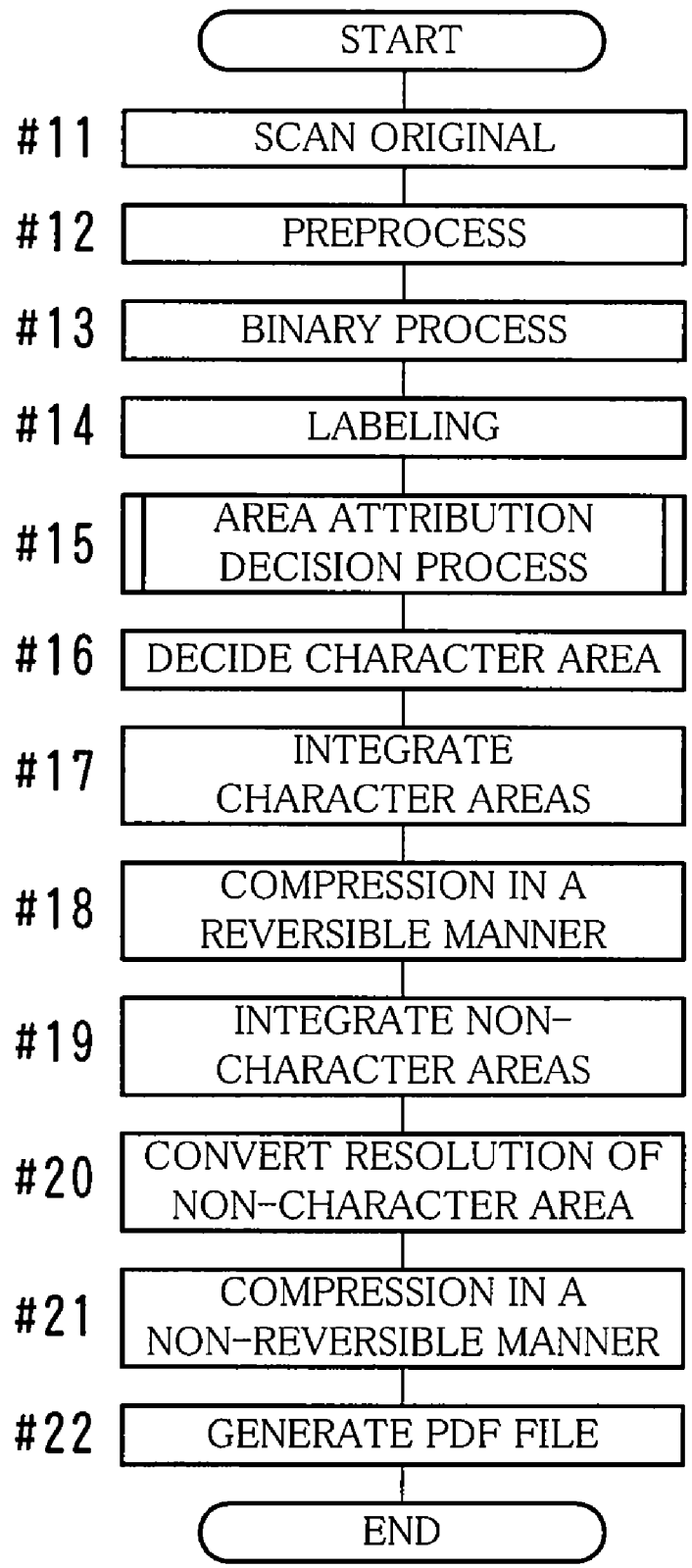
FIG. 22 is a flowchart for explaining a schematic flow of a process until a PDF file is generated in the image forming apparatus.

In FIG. 22, when the scanner 10a scans an original (#11), the image forming apparatus 1 performs a process such as ground removal, brightness conversion, smoothing or the like on an original image GG obtained by the scanner 10a (#12).

A binary process is performed on an original image DGb after such a preprocess so that a binary original image GV is generated (#13) and the labeling process is performed (#14). In addition, with respect to the block AK that is a rectangular area determined by the labeling process, a process for deciding an attribution thereof is performed (#15).

Based on a result of the decision concerning the attribution, it is further decided whether or not each block AK includes a character. The block AK that is decided to include a character is extracted as a character block AKM (#16). In addition, the block AK that is not decided to include a character is extracted as a non-character block (a diagram photograph area) AKH.

The character blocks AKM are integrated in accordance with a predetermined rule so that the number of them is reduced (#17). In addition, a binary image of a part corresponding to the character block AKM that has remained after the integration in the binary original image GV is compressed in a lossless manner (#18).

Next, the non-character blocks AKH are integrated in accordance with a predetermined rule so that the number of them is reduced (#19). In addition, a color image of a part corresponding to the non-character block AKH that has remained after the integration in the original image GGb is processed to have a lower resolution (#20) and is compressed in a lossy manner (#21).

A PDF file is generated by using the compressed data that is generated by the compression in the step #18 and the step #21.

Next, an area attribution decision process flow in the case where one block AK is noted in the area attribution decision process will be described with reference to FIGS. 23 and 24.

Figure 23:
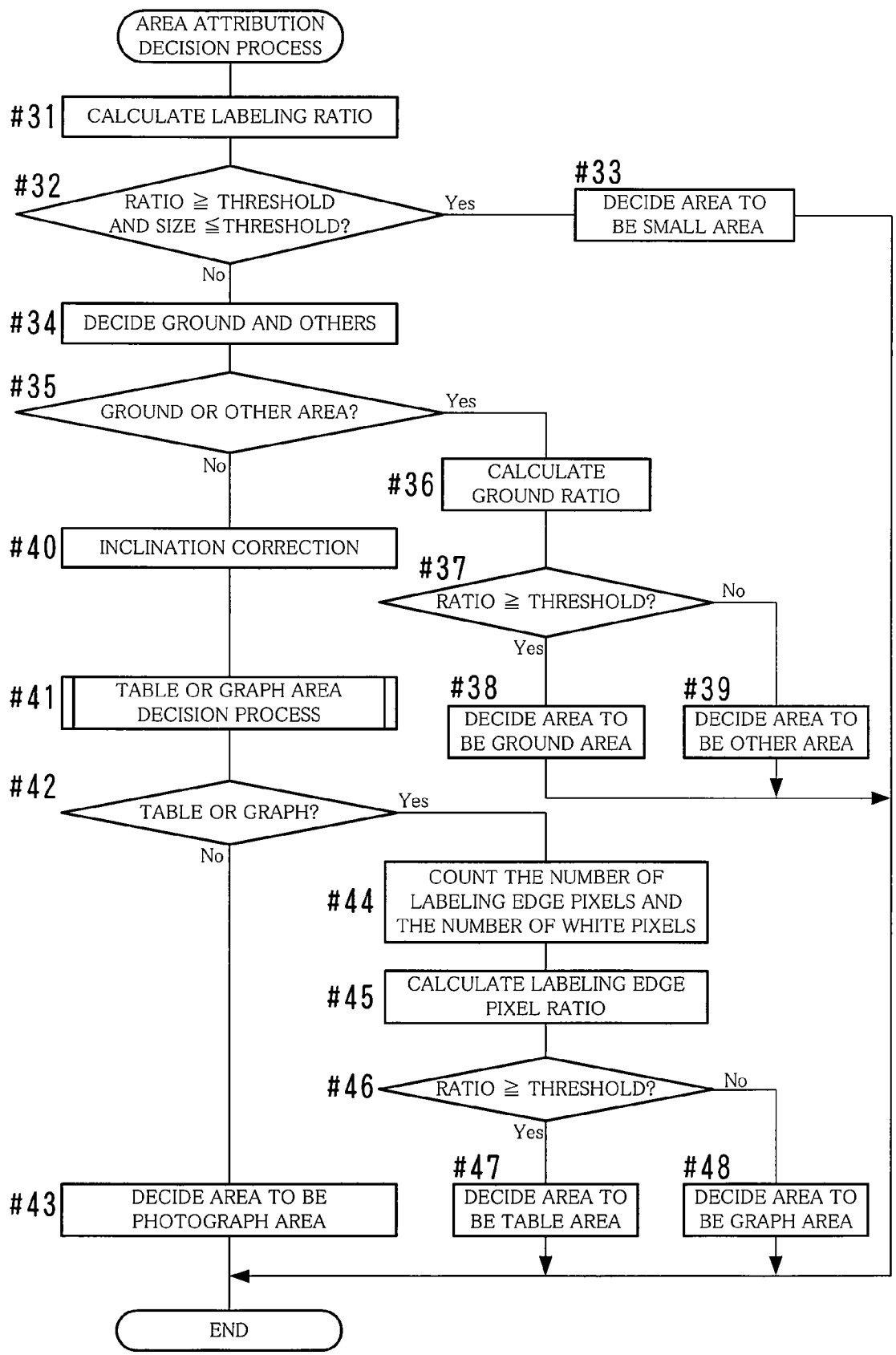
FIG. 23 is a flowchart for explaining an example of a flow of an area attribution decision process.
Figure 24:
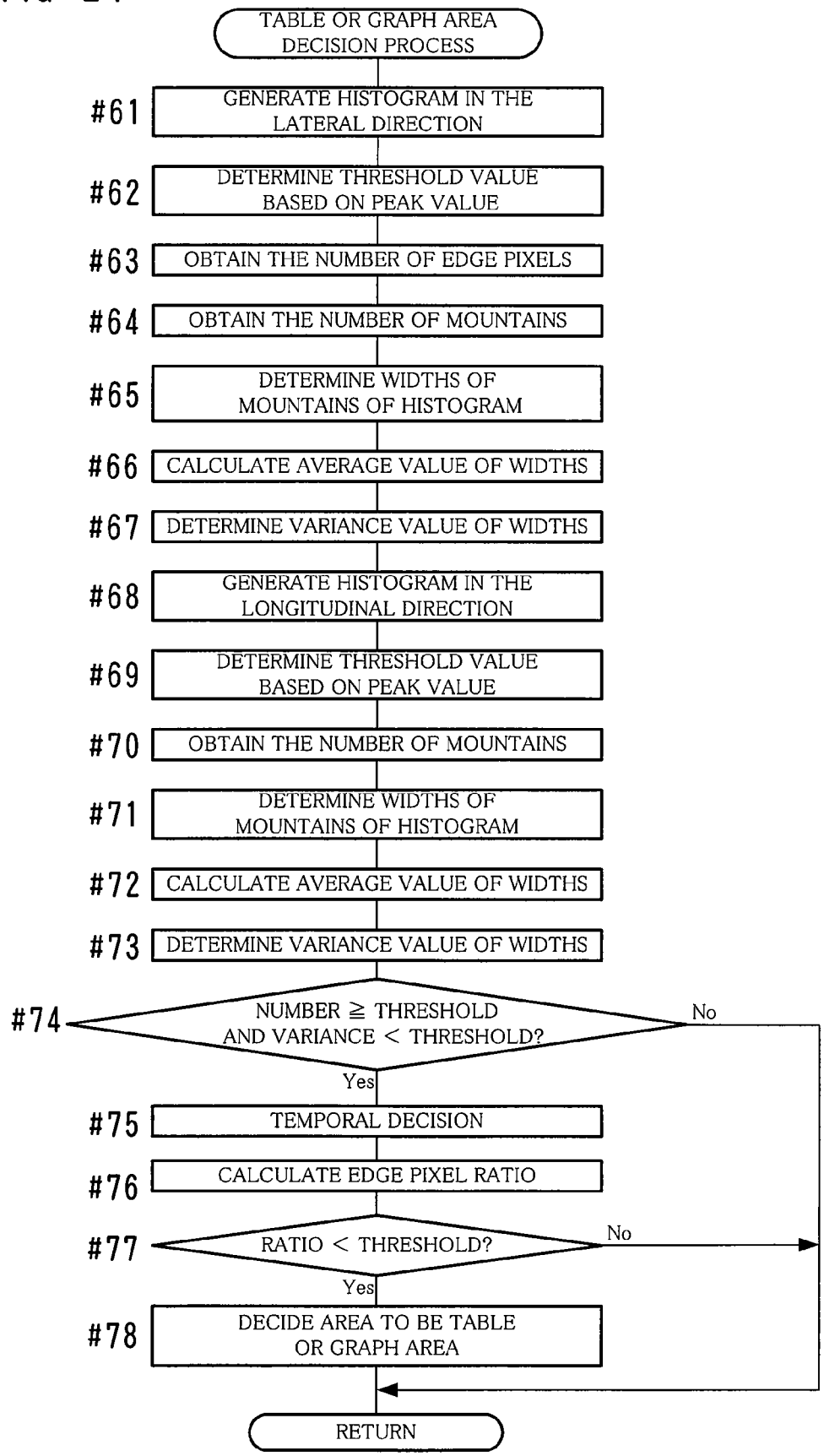
FIG. 24 is a flowchart for explaining a flow of a decision process for a table or graph area.

In FIG. 23, a labeling ratio of the block AK to be processed is determined first (#31). If longitudinal and lateral lengths indicated in the block size of the block AK are both smaller than or equal to a predetermined threshold value (250 pixel) and if the determined labeling ratio is larger than or equal to a predetermined threshold value (70%) (Yes in #32), the block AK is decided to be a small area (#33).

If the block size is larger than the predetermined threshold value or if the labeling ratio is smaller than the predetermined threshold value (No in #32), it is decided whether or not the block AK is a ground or other area (#34). When this decision is performed, a color image of a part corresponding to the block AK in the original image GGb is used for generating a histogram that indicates a relationship between the density thereof and the number with respect to each of the RGB. The histograms with respect to the RGB are combined with the state where peaks of them are adjusted to "255". Then, if the number of pixels in the range of +/−16 with respect to the X coordinate of the peak in the combined histogram is larger than or equal to a predetermined ratio (66%) of the number of all pixels, the block AK is decided to be a ground or other area. Note that this histogram is generated with ⅛ smoothing in the present embodiment. Therefore, "the number of all pixels" in this case means ⅛ of the total number of pixels in the block AK.

If the block AK is decided to be a ground or other area (Yes in #35), a ground ratio of the block AK is determined (#36). If the ground ratio is larger than or equal to a predetermined threshold value (90%) (Yes in #37), the block AK is decided to be a ground area. If the ground ratio is smaller than the predetermined threshold value (No in #37), the block AK is decided to be other area (#39).

If the block AK is not decided to be a ground or other area in the step #34 (No in #35), the inclination correction is performed with respect to an image in the block AK (#40), a table or graph area decision process is performed with respect to the block AK (#41).

In the table or graph area decision process, a color image of a part corresponding to the block AK in the original image GGb is obtained first so that an edge image corresponding to the color image is generated. A histogram that indicates a relationship between a position in the longitudinal direction in the block AK and the number of black pixels in the edge image arranged in the lateral direction at each position in the longitudinal direction is generated (#61 in FIG. 24). When the histogram is generated, a peak value of the histogram is detected, and a threshold value is determined based on the peak value and a predetermined setting value [ratio (33%)] (#62). In addition, when the inside of the block AK is scanned in the lateral direction for generating the histogram, the number of times of changing from a black pixel to a white pixel is determined with respect to each of the lines and the numbers are summed up to obtain the number of edge pixels (#63). In the generated histogram, the number of mountains having height above the threshold value determined in the step #62 is obtained (#64).

The generated histogram is traced in turn from the position of the line number "1", so that a line number when a predetermined threshold value is passed over in the increasing direction and a line number when the predetermined threshold value is passed over in the decreasing direction are obtained. A difference between the line numbers is made to be the mountain width. The histogram is traced until the end, widths of all the mountains having extreme value exceeds a threshold value thereof at its threshold value are determined (#65), and an average value of the determined widths is calculated (#66). A variance value of the width of the mountains is determined by using the average value (#67).

Next, a histogram indicating a relationship between a position in the lateral direction in the block AK and the number of black pixels of the generated edge image arranged in the longitudinal direction at each position in the lateral direction is generated (#68). When the histogram is generated, a peak value of the histogram is determined, and a threshold value is determined based on the peak value and a predetermined setting value (a ratio) (#69). In the generated histogram, the number of mountains having height above the obtained threshold value is determined (#70).

A variance value of mountain widths of the histogram generated in the step #68 is determined in the same manner as the procedure of the steps #65 to #67 (#71 to #73).

If the total sum of the number of mountains determined in the steps #64 and #70 is larger than or equal to a predetermined threshold value (five) and if both the variance values determined in the steps #67 and #73 are smaller than a predetermined threshold value (10) (Yes in #74), the block AK is decided to be a table or graph area temporarily (#75).

If the total sum of the number of mountains is smaller than the predetermined threshold value or if either of the variance values is larger than or equal to the predetermined threshold value (No in #74), the table or graph area decision process is finished.

After the block AK is decided to be a table or graph area temporarily, an edge pixel ratio is determined based on the number of edge pixels determined in the step #63 and a block size of the block AK (#76).

If the determined edge pixel ratio is smaller than a predetermined threshold value (Yes in #77), the block AK is decided to be a table or graph area (#78). If the determined edge pixel ratio is larger than or equal to the predetermined threshold value (No in #77), the table or graph area decision process is finished.

With reference to FIG. 23 again, if the block AK was not decided to be a table or graph area in the step #41 (No in #42), the block AK is decided to be a photograph area (#43).

If the block AK was decided to be a table or graph area in the step #41 (Yes in #42), a target binary image BN of the block AK is generated. The number of labeling edge pixels included in the target binary image BN and the number of white pixels are counted (#44). A labeling edge pixel ratio is determined based on the number of labeling edge pixels and the number of white pixels (#45).

If the determined labeling edge pixel ratio is larger than or equal to a predetermined threshold value (5%) (Yes in #46), the block AK is decided to be a table area (#47). If the determined labeling edge pixel ratio is smaller than the predetermined threshold value (No in #46), the block AK is decided to be a graph area (#48).

Recently, a multi function device such as an MFP (Multi Function Peripherals) is being shifted from one that performs a process suitable for monochrome images to one that performs a process suitable for color images (color supporting MFPs).

In addition, a function of converting an image of an original read by a scanner of the multi function device into a PDF file or the like and attaching the file to electronic mail for transmitting it directly from the multi function device is widely available.

When a color supporting MFP performs such a function, data quantity of the generated PDF file may be approximately 25 megabytes if an A4 size original is scanned as a 300 dpi full color image, which is difficult to transmit by electronic mail.

Therefore, it is common to compress the image of the scanned original before the transmission. However, if the compression is performed at high compression ratio so that quantity of data is reduced, a character portion may be lost and cannot be read. In order to avoid the situation, it is necessary to reduce the compression ratio. Then, it is difficult to reduce the quantity of data sufficiently.

Therefore, a function called a compact PDF (highly compressed PDF) is used conventionally. According to this function, instead of using the same compression method for the whole image data, different compression methods are used for different areas to be processed.

More specifically, areas are extracted from the image data of the scanned original on a photograph or graphic basis, and it is decided whether the area is a character area including a character or other non-character area. Then, an image of the character area is processed by the binary process with maintaining high resolution and is compressed by a lossless compression method such as the MMR. An image of the non-character area is compressed by the lossy compression method such as JPEG with high compression ratio after being converted into low resolution. Thus, a PDF file having small data quantity (file size) (a compact PDF file) with readability of the character that is maintained can be generated.

It is important for generation of this compact PDF file that a character portion is extracted correctly from the image of the scanned original, i.e., to discriminate the area including a character correctly from the character area. It is because if a mistake in the discrimination occurs, an image of the area is compressed at high compression ratio after being converted into low resolution. Then, a character in the area may become unreadable.

The decision whether or not an area includes a character (a character test) is performed in accordance with an attribution of the area (block AK). Therefore, a decision result concerning the attribution of the area AK influences accuracy of the character test. Since an attribution of an area (block AK) can be decided appropriately by the process described above in the present embodiment, accuracy of the character test can be improved as a result. Thus, a compact PDF file having higher readability of characters can be generated.

Although the example of the case where the PDF file is generated in the image forming apparatus 1 is shown in the present embodiment, it is possible to generate the PDF file in the terminal device 2. In this case, special software (a special program) including a module for generating a PDF file by the process described in the present embodiment should be installed in the terminal device 2. Furthermore, it is necessary to set so that when an original is scanned by the image forming apparatus 1, its image data is attached to electronic mail and is transmitted to the terminal device 2 automatically. In this way, each user of the terminal device 2 can select an image to be converted into a PDF according to its purpose and can generate a PDF file by using the special program.

Alternatively, it is possible to generate the PDF file by the server 3 (mail server). In this case, the special program as described above is installed in the server 3. In addition, it is set so that when the image forming apparatus 1 scans the original, its image data is transmitted to the server 3 automatically. Furthermore, it is set so that when the image data is transmitted to the server 3, the special program in the server 3 generates the PDF file of the image data automatically, which is attached to electronic mail and is sent to the terminal device 2 of the user. Thus, any user who can use the server 3 can obtain the PDF file generated by the process of the present embodiment.

In addition, it is possible to realize a part of functions of the portions shown in FIG. 3 by hardware. For example, hardware such as an input image processing portion and an output image processing portion is provided to the image forming apparatus 1. The input image processing portion obtains the original image GG from the scanner 10a and performs a process such as color conversion, color correction, resolution conversion, area discrimination or the like on the original image GG. The data after the process is stored in the hard disk drive 10c, the RAM 10d, the ROM 10e or the like.

When the printing process is performed based on the stored data, the output image processing portion performs screen control, smoothing process, PWM controls or the like prior to the printing process performed by the print device 10f.

Although the example of the case where the dotted pixel is the black pixel, it is not limited to the black pixel.

Other than that, the structure and the function of the whole or a part of the image forming apparatus 1, the threshold value, the setting value, the upper limit value, contents of each data, contents or orders of the processes and the like can be modified if necessary in accordance with a spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An area testing method for deciding a type of an area included in a target image to be a target of image processing, the method comprising:
    generating an edge image in accordance with the target image;
    generating a first histogram indicating the number of edge pixels that exist in the lateral direction at each position in the longitudinal direction within a predetermined area and a second histogram indicating the number of the edge pixels that exist in the longitudinal direction at each position in the lateral direction within the predetermined area, the edge pixels indicating an edge in the predetermined area of the generated edge image;
    determining a variance value of a width of a mountain having a height that exceeds a predetermined threshold value in the generated first histogram and second histogram, wherein the width is measured at a height equal to the predetermined threshold value; and
    deciding whether or not the predetermined area is at least one of a table area and a graph area based on the determined variance value;
    wherein the method is performed utilizing a processor.

2. The area testing method according to claim 1, wherein the deciding whether or not the predetermined area is at least one of a table area and a graph area is performed based on the number of mountains having an extreme value that exceeds a predetermined threshold value in the generated first histogram and second histogram and the determined variance value.

3. The area testing method according to claim 1, wherein the deciding whether or not the predetermined area is at least one of a table area and a graph area is a temporary decision, and if it is temporarily decided that the predetermined area is at least one of a table area and a graph area, the method further comprises determining a value of a ratio in the predetermined area about quantity of a portion indicating an edge in the predetermined area in the case where the edge image is generated and deciding whether or not the predetermined area is at least one of a table area and a graph area based on the determined value.

4. The area testing method according to claim 1, wherein the predetermined area is one of a ground area, a photograph area, a table area, a graph area and an other area, further comprising
    deciding whether or not the predetermined area is one of a ground area or an other area if the predetermined area is no less than a size threshold
    performing a process of correcting image inclination indicated in the predetermined area if it is decided that the predetermined area is neither a ground area nor an other area, and
    generating the first histogram and the second histogram for the predetermined area after the process of correcting image inclination is performed.

5. The area testing method according to claim 1, wherein if the predetermined area is decided to be at least one of a table area and a graph area, then
    determining a ratio of the number of pixels within the predetermined area that are adjacent to the boundaries of connected components of dotted pixels within the predetermined area to the number of pixels within the predetermined area that are neither dotted nor adjacent to the boundaries, a dotted pixel being a foreground pixel in a binary image generated from the target image, and
    deciding whether the predetermined area is a table area or a graph area based on the determined ratio.

6. The area testing method according to claim 1, wherein the predetermined area is a rectangular area including connected dotted pixels that are foreground pixels in a binary image generated from the target image.

7. An area testing method for deciding a type of a predetermined area included in a target image to be a target of image processing, comprising:
    extracting an area that is less than a size of a threshold first from the predetermined area that is one of a ground area, a photograph area, a table area, a graph area and an other area, the predetermined area also being a rectangular area including a group of connected pixels that are connected dotted pixels that are foreground pixels in a binary image that is generated from the target image;
    extracting a ground area or an other area from the predetermined area that has remained without being extracted;

performing a process of correcting inclination of an image included in the still remaining predetermined area;

with respect to the predetermined area after the process of correcting inclination of an image, generating a first histogram indicating the number of edge pixels that exist in the lateral direction at each position in the longitudinal direction within the predetermined area and a second histogram indicating the number of the edge pixels that exist in the longitudinal direction at each position in the lateral direction within the predetermined area, the edge pixels indicating an edge in the predetermined area when an edge image is generated from the target image;

determining a variance value of a width of a mountain having a height that exceeds a predetermined threshold value in the generated first histogram and second histogram, wherein the width is measured at a height equal to the predetermined threshold value;

deciding temporarily whether or not the predetermined area is at least one of a table area and a graph area based on the determined variance value;

with respect to the predetermined area that is decided temporarily to be at least one of a table area and a graph area, determining a ratio in the predetermined area about quantity of a portion indicating an edge in the predetermined area in the case where the edge image is generated;

deciding whether or not the predetermined area related to the value is at least one of a table area and a graph area based on the determined value;

with respect to the predetermined area that is decided to be at least one of a table area and a graph area;

determining a value of a ratio about the number of pixels meeting a boundary of the group of the connected pixels within the predetermined area; and deciding whether the predetermined area is a table area or a graph area based on the determined value;

wherein the method is performed utilizing a processor.

8. An area testing device for deciding a type of a predetermined area included in a target image to be a target of image processing, the device comprising:

a variance value calculator that determines a variance value of a width of a mountain having a height that exceeds a predetermined threshold value in a first histogram and a second histogram, wherein the width is measured at a height equal to the predetermined threshold value, the first histogram indicating the number of edge pixels that exist in the lateral direction at each position in the longitudinal direction within the predetermined area, the second histogram indicating the number of the edge pixels that exist in the longitudinal direction at each position in the lateral direction within the predetermined area, the edge pixels indicating an edge in the predetermined area when an edge image is generated from the target image; and a decision portion that decides whether or not the predetermined area is at least one of a table area and a graph area based on the determined variance value.

9. An image processing apparatus for performing image processing, the apparatus comprising;

an edge image generator that generates an edge image based on a target image to be a target of the image processing;

a histogram generator that generates a first histogram indicating the number of edge pixels that exist in the lateral direction at each position in the longitudinal direction within a predetermined area and a second histogram indicating the number of the edge pixels that exist in the longitudinal direction at each position in the lateral direction within the predetermined area, the edge pixels indicating an edge in the predetermined area of the generated edge image;

a variance value calculator that determines a variance value of a width of a mountain having a height that exceeds a predetermined threshold value in the generated first histogram and second histogram, wherein the width is measured at a height equal to the predetermined threshold value;

a decision portion that decides whether or not the predetermined area is at least one of a table area and a graph area based on the determined variance value; and an image processing execution portion that executes image processing according to the decision of the decision portion on the area related to the decision of the target image.

10. A computer readable medium storing a program for making a computer perform image processing comprising:

generating an edge image based on a target image to be a target of the image processing;

generating a first histogram indicating the number of edge pixels that exist in the lateral direction at each position in the longitudinal direction within a predetermined area and a second histogram indicating the number of the edge pixels that exist in the longitudinal direction at each position in the lateral direction within the predetermined area, the edge pixels indicating an edge in the predetermined area of the generated edge image;

determining a variance value of a width of a mountain having an a height that exceeds a predetermined threshold value in the generated first histogram and second histogram, wherein the width is measured at a height equal to the predetermined threshold value; and deciding whether or not the predetermined area is at least one of a table area and a graph area based on the determined variance value.

* * * * *